United States Patent
Briggs et al.

(10) Patent No.: US 10,652,514 B2
(45) Date of Patent: May 12, 2020

(54) RENDERING 360 DEPTH CONTENT

(71) Applicant: Facebook, Inc., Menlo Park, CA (US)

(72) Inventors: Forrest Samuel Briggs, Palo Alto, CA (US); Michael John Toksvig, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 36 days.

(21) Appl. No.: 16/040,538

(22) Filed: Jul. 19, 2018

(65) Prior Publication Data

US 2020/0029063 A1    Jan. 23, 2020

(51) Int. Cl.
| | |
|---|---|
| H04N 13/128 | (2018.01) |
| G06T 7/529 | (2017.01) |
| H04N 13/117 | (2018.01) |
| G06T 3/00 | (2006.01) |
| G06T 3/20 | (2006.01) |
| G06T 15/04 | (2011.01) |
| G06T 15/80 | (2011.01) |
| H04N 13/161 | (2018.01) |

(52) U.S. Cl.
CPC ......... *H04N 13/128* (2018.05); *G06T 3/0087* (2013.01); *G06T 3/20* (2013.01); *G06T 7/529* (2017.01); *G06T 15/04* (2013.01); *G06T 15/80* (2013.01); *H04N 13/117* (2018.05); *H04N 13/161* (2018.05)

(58) Field of Classification Search
CPC .. H04N 13/128; H04N 13/117; G06T 3/0087; G06T 3/20; G06T 15/04; G06T 15/80; G06T 7/529
USPC .......................................................... 348/36
See application file for complete search history.

(56) References Cited

U.S. PATENT DOCUMENTS

| | | | |
|---|---|---|---|
| 8,692,848 B2 | 4/2014 | Adams et al. | |
| 2003/0095131 A1 | 5/2003 | Rondinelli | |
| 2006/0023105 A1 | 2/2006 | Kostrzewski et al. | |
| 2006/0087507 A1* | 4/2006 | Urano | G06T 15/20 345/421 |
| 2011/0148901 A1* | 6/2011 | Adams | G06T 11/40 345/589 |
| 2013/0002813 A1 | 1/2013 | Vaught et al. | |

(Continued)

FOREIGN PATENT DOCUMENTS

WO    WO 2014/043814 A1    3/2014

OTHER PUBLICATIONS

International Search Report and Written Opinion, PCT Application No. PCT/US2018/059889, dated May 15, 2019, fourteen pages.

(Continued)

*Primary Examiner* — Patricia I Young
(74) *Attorney, Agent, or Firm* — Fenwick & West LLP

(57) ABSTRACT

As user device can receive and display 360 panoramic content in a 360 depth format. 360 depth content can comprise 360 panoramic image data and corresponding depth information. To display 360 depth content, the user device can generate a 3D environment based on the 360 depth content and the current user viewpoint. A content display module on the user device can render 360 depth content using a standard 3D rendering pipeline modified to render 360 depth content. The content display module can use a vertex shader or fragment shader of the 3D rendering pipeline to interpret the depth information of the 360 depth content into the 3D environment as it is rendered.

20 Claims, 15 Drawing Sheets

(56) References Cited

U.S. PATENT DOCUMENTS

2013/0044108 A1  2/2013  Tanaka et al.
2015/0358613 A1  12/2015  Sandrew et al.

OTHER PUBLICATIONS

European Patent Office, Extended Search Report and Opinion, European Patent Application No. 19157483.9, dated Jul. 31, 2019, eleven pages.
Laszlo, S. et al., "Displacement Mapping on the GPU—State of the Art," *Computer Graphics Forum*, Sep. 1, 2008, vol. 25, No. 3, XP002637303, twenty-four pages.

\* cited by examiner

RENDERING 360 DEPTH CONTENT

BACKGROUND

Virtual reality (VR) content, 3D 360 degree panoramic content, or other 3D content can provide a uniquely immersive experience to a user. For example, VR or 360 degree panoramic content can give a user the ability to "look around" inside a virtual environment or other 3D scene while motion or other activity occurs around the user.

3D content (such as VR content or 3D 360 degree panoramic content) can be stored and relayed to user devices for display in a conventional video file format (i.e. a 2D video codec such as H.264 or file format such as .mp4, .avi, or any other suitable format). The user device can then interpret the received file to extract and display the 3D content to a user. For example, 3D video content can be stored as a stereoscopic video, a video file containing separate video content for each of a user's eyes. The user device can then interpret and display the received 3D content. However traditional methods of storing 3D content in conventional video file formats can introduce artifacts into the video content and lead to a poor experience for the end user. For example, stereoscopic video content has problems handling a user looking up or down (or user rolling or tilting their head). Similarly, stereoscopic 3D 360 panoramic content can produce a progressively less convincing image towards the user's peripheral vision. Therefore improved methods of storing and playing back 3D video content are required.

SUMMARY

As user device can receive and display 360 panoramic content in a 360 depth format. 360 depth content can comprise 360 panoramic image data and corresponding depth information. To display 360 depth content, the user device can generate a 3D environment based on the 360 depth content and the current user viewpoint. A content display module on the user device can render 360 depth content using a standard 3D rendering pipeline modified to render 360 depth content. The content display module can use a vertex shader or fragment shader of the 3D rendering pipeline to interpret the depth information of the 360 depth content into the 3D environment as it is rendered.

In some embodiments, a vertex shader is used to shift the vertices of the 3D environment proportional to the depth information of the 360 depth content. The shifted vertices can distort the 3D environment to resemble the 3D environment the 360 depth content is intended to represent. Similarly, a fragment shader, as an alternative to the vertex shader method, can be programmed to alter the color of each fragment based on an associated depth for the fragment recorded in the 360 depth content. Storing and playing back 360 depth content can allow a more immersive user experience for the 3D content and by storing the video content as image data with depth (e.g., in contrast to separately encoding each viewpoint) typically reduces the size of the video file. In addition, the depth data can be represented as a portion of a frame along with the image data, permitting encoding of the video using video encoders configured for video compression.

Figure 1:
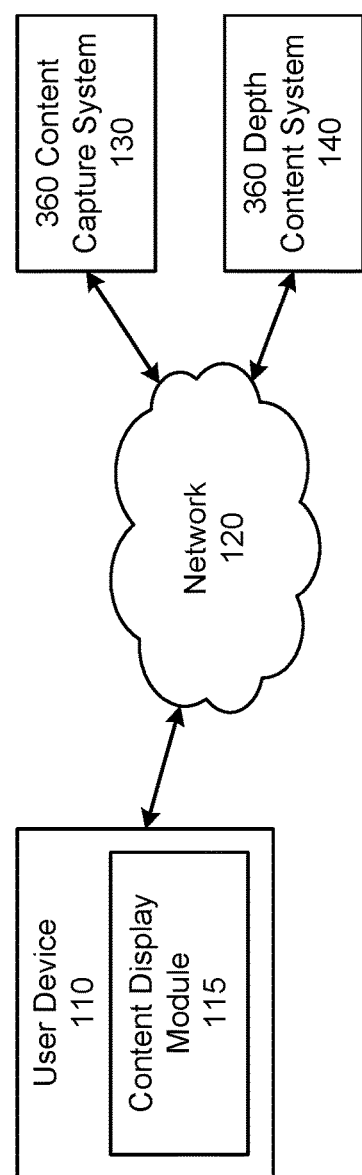
FIG. 1 is a block diagram of an example environment in which 360 depth content is used, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Overview

As described above, 3D stereoscopic video can be stored using a traditional 2D video format (.mpeg, .mp4, .avi, etc.) where each frame of the 3D video contains a left eye view in one portion of the frame and a right eye view in the other portion of the frame. However, traditional 3D stereoscopic video can introduce artifacts into the video content and lead to a poor experience for the end user. For example, 3D stereoscopic video content has problems handling a user looking up or down (or user rolling or tilting their head). Similarly, stereoscopic 3D 360 panoramic content can produce a progressively less convincing image towards the user's peripheral vision. In addition, since each frame of stereoscopic video may include a complete eye view for each eye, file sizes for such video can be large.

Therefore, alternate means of storing 360 panoramic content, such as 360 depth format disclosed herein, can be used to reduce storage requirements and improve playback experience for the 360 panoramic content. As used herein, 360 depth content comprises 360 panoramic image data (for example, a 360 video, 360 image, or other images and/or videos comprising image pixel data about a scene) as well as depth information about the 360 panoramic image data (for example, a depth map corresponding to the 360 panoramic image data). Though 360 depth content is discussed herein in the context of panoramic content (e.g., content representing a viewing angle horizontally from 0 to $2\pi$ and vertically from 0 to $\pi$), more generally these techniques may be used for any other content displaying by showing distinct eye views to each eye of a viewer (for example, content which can be stored in a stereoscopic format or 3D environment format intended for stereoscopic display). For example, these techniques can be used for any suitable visual content (for example, a still image or a visual content frame of a set of video frames) comprising image pixel data. In some embodiments, a user device playing back 360 depth content can generate a 3D environment (or portion of a 3D environment) based on the 360 panoramic image and depth information contained in the 360 depth content. Storing and playing back 360 depth content can allow a more immersive user experience for the 3D content, in some implementations at the cost of greater processing resources (for example, to generate the 3D environment for playback). In some implementations, a content display module on a user device can render 360 depth content (or other suitable visual content) using a standard 3D rendering pipeline modified to render 360 depth content. For example, the content display module can use a vertex shader or fragment shader of the 3D rendering pipeline to interpret the depth information of the 360 depth content.

FIG. 1 is a block diagram of an example environment in which 360 depth content is used, according to one embodiment. The environment 100 of FIG. 1 includes a user device comprising a content display module 115, a network 120, a 360 content capture system 130, and a 360 depth content system 140.

The user device 110 is a computing device capable of receiving and displaying 3D content to a user. For example, the user device 110 can be a laptop computing system, mobile device, tablet computer, desktop computing system, Virtual Reality (VR) system or any other suitable device. The user device 110 can receive 3D content, such as from the 360 depth content system 140 through the network 120, and display 3D content to a user. In some implementations, the user device 110 includes specific hardware for displaying 3D content to a user. For example, the user device 110 can be connected to a VR head-mounted display, 3D screen, or other similar hardware. Similarly, the user device 110 can employ 3D content display methods to display 3D content to a user on standard display devices. The user device 110 can determine the head position and orientation of a user, for example through gyroscopes, user-facing camera systems, or other suitable sensors.

The content display module 115 of the user device 110 can interpret and display received 3D content to a user via the display hardware of the user device 110, according to some embodiments. For example, the content display module 115 can render 360 depth content into individual frames or eye views for display to a user (herein, "output images"). In some embodiments, the content display module 115 can recreate a 3D environment based on the depth information of the 360 depth content in the process of rendering the 360 depth content. The content display module 115 and rendering 360 depth content will be discussed further below.

The network 120 can be any suitable network or communication method for connecting one or more user devices 110, the 360 content capture system 130, and the 360 depth content system 140. For example, the network 120 can be any suitable wired or wireless network or system of networks, such as a local area network (LAN), wide area network (WAN), the Internet, a cellular data network (for example, using 3G or 4G LTE technologies), or any other suitable network or communication technology.

In some embodiments, the 360 content capture system 130 captures video and other data for generating 360 depth content. The 360 content capture system 130 can comprise one or more cameras (or other image capture systems) used to capture image or video data of a physical scene or environment. Similarly, the 360 content capture system 130 can capture depth information associated with the captured image data using one or more depth sensors, such as RADAR, SONAR, or LIDAR sensors, or using other suitable depth calculations methods. For example, calculating depth using stereoscopic effect from adjacent cameras. In some embodiments, the 360 content capture system 130 captures enough information about the surrounding environment to generate 360 panoramic images with corresponding depth information based on the captured image data. For example, each frame of captured image data can have corresponding depth information captured by the 360 content capture system. The 360 content capture system 130 can transmit captured image/video data and depth information to the 360 depth content system 140 for processing into 360 depth content.

The 360 depth content system 140, according to some embodiments, can generate 360 depth content based on raw image or video data and corresponding depth information. Similarly, the 360 depth content system 140 can store and transmit 360 depth content (such as 360 depth videos) to one or more user devices 110 for display to users. For example, the 360 depth content system 140 can receive raw image data and corresponding depth data from a plurality of cameras and depth sensors of a 360 content capture system 130 and assemble the received content into a 360 depth video. In some embodiments, the 360 depth content system 140 assembles image data from multiple cameras with different fields of view into a 360 panoramic video for 360 depth content. Similarly, the 360 depth content system 140 can assemble depth information from a plurality of depth sensors to generate depth maps for 360 depth content. In some embodiments, the 360 depth content system 140 can generate depth maps for 360 depth content based on the received image content, for example, using optical flow methods and/or the output of stereoscopic cameras to estimate depth information. In other embodiments, the 360 depth content system 140 uses a virtually modelled environment (for example, a virtual environment created using a 3D modelling software) to render and generate 360 depth content based on the virtual environment. In some implementations, the generated 360 depth content is stored in a 360 depth video format (discussed further below) for transmission and playback at a user device 110.

Figure 2:
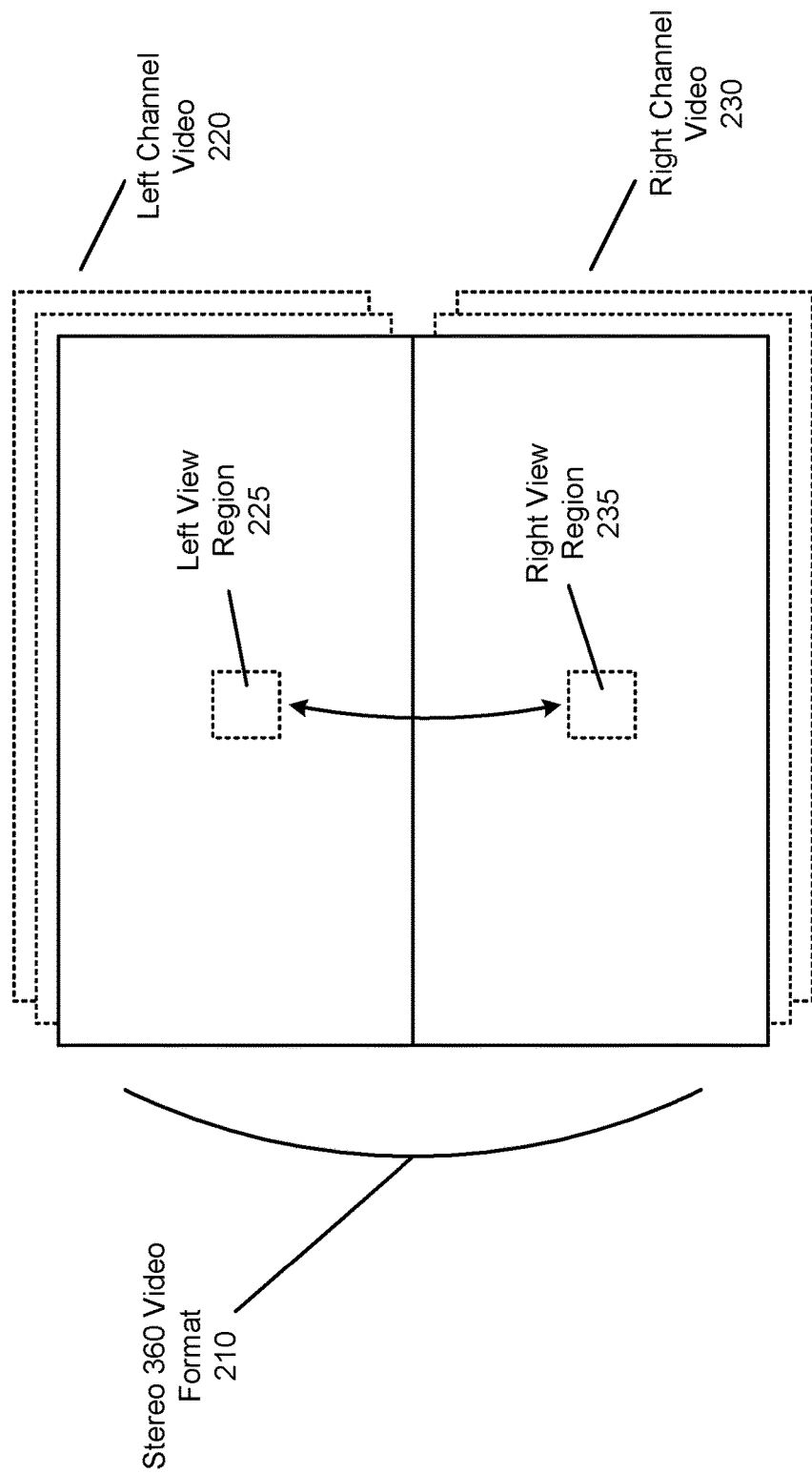
FIG. 2 illustrates an example stereo 360 video format, according to one embodiment.

As described above, previous implementations of storing 360 content use a stereo 360 format to store 360 content. FIG. 2 illustrates an example stereo 360 video format, according to one embodiment. The stereo 360 video format 210 is a method of storing 3D video content in a stereoscopic format for later display. Stereo 360 content includes separate content intended for each eye of a viewer. For example, the stereo 360 video format 210 comprises the left channel video 220 and the right channel video 230, where each is a 360 panoramic view of the scene associated with the user's left or right eye, respectively. In some embodiments, each region in the left channel video 220 has a corresponding region in the right channel video. For example, the left view region 225 can correspond to the right view region 235. To display stereo 360 content from the stereo 360 video format 210, corresponding sections of the left and right channel videos 220 and 230 can be selected and displayed to each of the user's eyes, producing a stereoscopic 3D effect. Depending on the direction of the user's view, different sections of the left and right channel videos 220 and 230 can be selected for display. The size of the selected sections can be determined based on the field of view of the intended display device and the location of the selected section can be determined based on the orientation of the user's head, according to some embodiments. When playing back stereo 360 content, a user device 110 can repeat the process of selecting and displaying sections of the left and right channel videos 220 and 230 for each frame of the stereo 360 content. The stereo 360 video format 210 is configured to store 360 panoramic 3D content, however, similar formats can be used to store 360 panoramic 3D images or traditional 3D content (such as non-360 panoramic content). In the stereo 360 video format 210, the left and right channel videos 220 and 230 are vertically stacked such that the left channel video 220 is above the right channel video 220, however, other embodiments can have the left and right channel videos 220 and 230 in any suitable orientation (such as horizontally stacked, stored in alternating frames, separate channels, separate video files, or otherwise stored in any other suitable method).

Stereoscopic 360 formats such as the stereo 360 video format 210 can be easy for a user device 110 to process and display, for example, because generating an eye view for a user's left eye comprises a non-computationally intensive process of selecting and extracting the correct portion of the left channel video 220. Similarly, stereoscopic 360 formats can represent occluding objects in the scene, as the left and right channel videos 220 and 230 are separate and therefore can contain different information as appropriate to represent the corresponding eye.

Despite the ease of implementation described above, stereoscopic 360 formats can introduce visual artifacts and limitations on 360 panoramic content stored using a stereoscopic 360 format. For example, because the spatial relationship between the left channel video 220 and the right channel video 230 (that is, the relative position between the viewpoints of the left and right channel videos 220 and 230 at any given point) is fixed at the creation of the stereo 360 video, changes in the angle of the user's head are not supported by stereoscopic 360 formats. For example, the user tilting or rolling their head (or turning upside down) will not be correctly reflected in the viewed stereoscopic 360 content, producing an unpleasant viewing experience for a user. Similarly, a 360 stereoscopic video cannot support stereoscopic 3D at the extreme upper and lower edges of the left and right channel videos 220 and 230 without introducing severe visual artifacts. For example, as a user looks directly upwards (and potentially spins in place) the stereoscopic 360 content does not contain enough information to show a correct 3D image from all rotations, and therefore will show a monoscopic image. Similarly, because eye views are extracted directly from the preexisting left and right channel videos 220 and 230, generated eye views incorporate a number of assumptions integral to 360 panoramic images. For example, only the center of each generated eye view is correct, the rest of the eye view will be only a close approximation for the current user head position (but will be correct for some other head position). These inaccuracies towards the periphery of the eye view may lead to the content appearing to "swim" when the user moves their head (as the approximated sections become accurate as the user turns their head to place them at the center of the frame). Therefore, alternative methods of storing 360 panoramic 3D content can improve the user experience when viewing such content on a user device 110.

Figure 3:
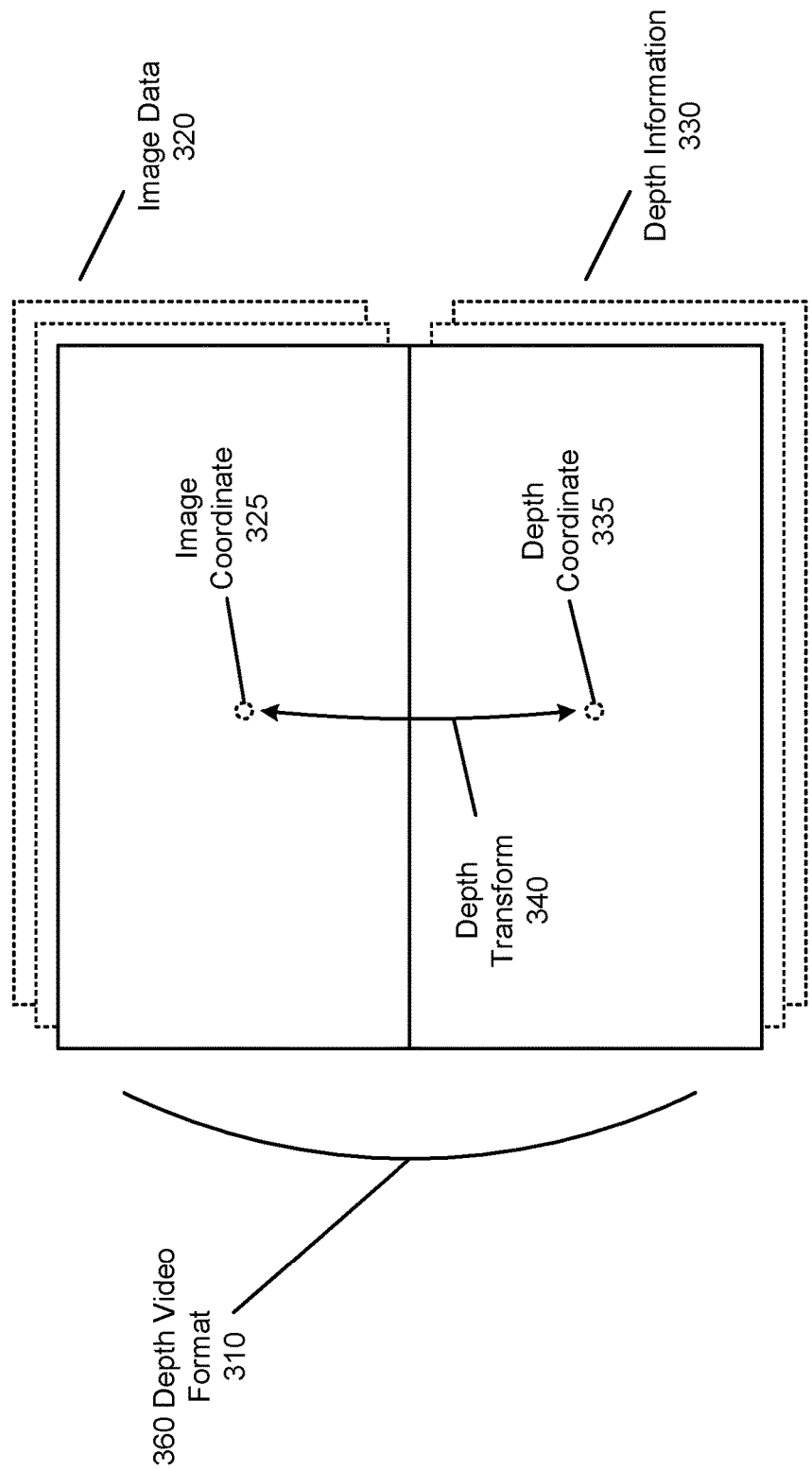
FIG. 3 illustrates an example 360 depth map video format, according to one embodiment.

FIG. 3 illustrates an example 360 depth map video format, according to one embodiment. Similar to the stereo 360 video format 210, the 360 depth video format 310 is a method of storing 3D video content for later display on a user device 110. Unlike stereo 360 content, 360 depth content stored in, for example, the 360 depth video format 310 allows a user device 110 to partially recreate a 3D environment based on the image/video content and associated depth information of the 360 depth content. 360 depth content can be useful for transmitting 360 panoramic scenes, as the partial 3D recreation of a scene avoids many of the inherent problems when viewing stereo 360 content (especially when viewed in VR). The 360 depth video format 310 comprises image data 320 and associated depth information 330. In some embodiments, 360 depth content comprises a series of frames (herein, "360 depth frames") each comprising image data 320 and associated depth information 330.

The 360 depth video format 310 is configured to store 360 panoramic 3D content, however, similar formats can be used to store 360 panoramic 3D images or traditional 3D content (such as non-360 panoramic content or other suitable visual content with any suitable viewing angles). In the 360 depth video format 310, the image data 320 and depth information 330 are vertically stacked such that the video information 320 is above the depth information 330, however, other embodiments can have the image data 320 and depth information 330 in any suitable orientation (such as horizontally stacked, stored in alternating frames, separate channels, as video files, or otherwise stored in any suitable manner).

The image data 320 can be a 360 panoramic image or video of an environment (such as a virtual environment or a physical environment captured by one or more cameras). The image data 320 can be in any suitable 360 panoramic projection, for example an equirectangular or cubemap type projection. In some embodiments, the image data 320 is centered on an origin point, for example representing the location (or simulated location, in the case of a virtual environment) from which the image data 320 accurately represents the view of the environment. For example, in the case of a physical environment captured from a 360 camera (or camera system), the origin point can be the location of the 360 camera within the environment. In some implementations, the image data 320 is used as a texture for a 3D recreation of the environment.

According to some embodiments, the depth information 330 contains the depth of various points in the environment captured in the image data 320. The depth information 330 can record the depth for a point in the environment as the distance from the point to the origin point of the image data 320. For example, the depth for a pixel of the image data 320 representing a point on a car is the distance from that point on the car to the origin point of the image data 320 (for example, the distance from the car to the 360 content capture system 130). In some embodiments, the depth information 330 is a depth map encoding depth information in the pixel intensity values of an image. Each pixel of the depth map can encode the depth of a corresponding pixel (or set of pixels) of the image data 320. For example, an image coordinate 325 within the image data 320 can have a corresponding depth coordinate 335 within the depth information 330. According to some embodiments, the depth coordinate 335 corresponding to an image coordinate 325 can be determined by applying a depth transform 340 to the image coordinate 325. The depth transform 340 can be an offset (for example, in pixels) to move from a pixel or region of the image data 320 to a corresponding pixel or region of the depth information 330. 360 depth content can have a 360 panoramic image (for example, in an equirectangular projection) as the image data 320, and a corresponding 360 depth map as the depth information 330.

In some implementations, the depth map directly encodes depth information for a pixel of the image data 320 into the pixel intensity values of the corresponding pixel of the depth map, for example, where a depth of 10 meters for a pixel is represented by a value of 10 in the depth map. In other embodiments, the depth map encodes depth information in a "1/d" or "log(d)" format, for example, where a depth of 10 meters is represented by a value of 0.1 or log(10) in the depth map. In some embodiments, using a 1/d or log(d) format for encoding a depth map allows depths near the origin point (and therefore the user's viewpoint) to be more accurately stored within the depth map (at the cost of reducing the accuracy of depths far from the origin point). This can be advantageous because where small changes in depth near the user's viewpoint will be more noticeable to the user than changes in depth of distant objects.

Because a depth map only requires one channel (for a greyscale image), depth 360 content (using half the image as a full color RGB and the other half as a grayscale depth map) can be more efficiently compressed and stored than equivalent stereo 360 content (where each eye view is a full RGB image), according to some embodiments. Therefore 360 depth content can have a smaller file size than equivalent stereo 360 content. Similarly, as the depth map can be represented as image data, the 360 depth content can be stored as a video file using a video encoder (and can correspondingly use video compression algorithms to reduce the size of the 360 depth content files). However, displaying 360 depth content can require more computing power from a user device 110 than displaying equivalent stereo 360 content. For example, displaying a frame of 360 depth content can recreate a partial 3D environment to determine each eye view (or other output image). However, as described above, 360 depth content has associated several benefits when compared to stereo 360 content. For example, because each eye view is determined from a recreated 3D environment, the user device 110 can determine correct eye views for any (reasonable) user head orientation or position. For example, 360 depth content can support the user looking directly up or down, tilting or rolling their head, or even viewing the 360 depth content while upside down using the 360 depth video format 310. Similarly, the user device 110 can simulate the accurate position of the user's eyes as the user moves relative to the recreated environment, allowing the 360 depth content to accurately simulate the position and view of a user without the "swim" and neck model issues inherent to stereo 360 content.

In some embodiments, the user device 110 renders a 3D environment from the 360 depth content in the process of determining eye views to display to the user, which can be generated from multiple viewpoints within the 3D environment (for example, at viewpoints representing the user's eyes). Unlike stereo 360 content, the image data 320 of the 360 depth video format 310 includes image data from a single viewpoint (at the origin point). Therefore, the recreated 3D environment can be used to generate multiple eye views from the single set of image data 320. The 3D environment, as used herein, can a polygonal 3D representation of scene, for example, using tris, quads, or other suitable polygon shapes. Each polygon of the 3D environment represents a surface (or portion of a surface) within the 3D environment and is comprised of a set of vertices giving the location of the corners of the polygon. In some embodiments, the user device 110 rendering 360 depth content generates a sphere around an origin point of the 360 depth content to use as the 3D environment. The user device 110 can then wrap the interior of the sphere with the image data 320 of a 360 depth frame to be rendered. The content display module 115 of the user device 110 can then render one or more eye views by placing user viewpoints within the texturized sphere (for example, at positions corresponding to a user's eyes). However, without additional processing, the rendered eye views would appear flat (like looking at the inside of a sphere), as currently the depth information 330 of the 360 depth content is not reflected by the texturized sphere. In some embodiments, the depth information 330 is used during the rendering process to give the correct depth to the output images (for example, the generated eye views). For example, depth can be incorporated into the 3D environment by warping the texturized sphere to match the depth information 330, or by determining the correct color and/or pixel intensity information for each pixel of an eye view based on the depth information 330.

Figure 4A:
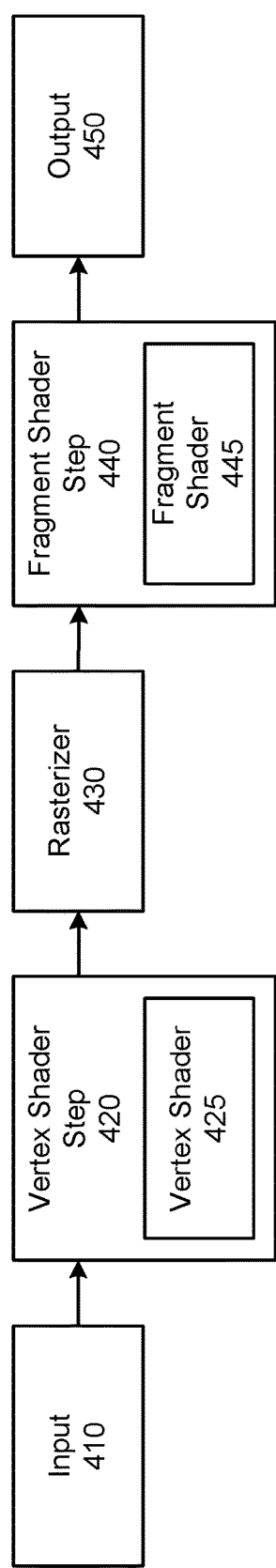
FIG. 4A is a block diagram of an example 3D rendering pipeline, according to one embodiment.

In some embodiments, the content display module 115 uses a 3D rendering pipeline to render the recreated 3D environment for each eye view. In some embodiments, a 3D rendering pipeline is a series of software steps that take a 3D environment as an input and renders a final output eye view (for example, for display to a user) based on the 3D environment. FIG. 4A is a block diagram of an example 3D rendering pipeline 360 depth frame (or other 360 depth content), according to one embodiment. The 3D rendering pipeline 400 of FIG. 4 includes an input 410, vertex shader 420, rasterizer 430, fragment shader 440, and output 450.

The input 410, according to some embodiments, receives relevant information for rendering an eye view or other output image. In some embodiments, the input 410 of the 3D rendering pipeline 400 receives a 3D environment and texture information to be rendered, as well as a viewpoint from which to render the 3D environment. The 3D environment can be any suitable 3D model, set of 3D models, or other stored 3D environment. For example, a content display module 115 can use a 3D sphere centered on the origin point of 360 depth content to render an output image for the 360 depth content. The texture information for the 3D environment can be received in any suitable texture format. For example, the content display module 115 can extract one or more 360 depth frames from 360 depth content to use as texture information for rendering the eye views for the 360 depth content, as described above. In some embodiments, the viewpoint for the current 360 depth frame determines the position and field of view of the output image generated by the 3D rendering pipeline 400. For example, when rendering for 360 depth content, the viewpoint for an eye view can be determined based on a tracked position and orientation of the user's eye or head (along with a field of view based on the display system of the user device 110). Based on the received 3D environment and texture information, the input 410 can map a texture region to each polygon of the 3D environment. For example, the input 410 can assign each vertex of the 3D environment to a specific texture coordinate within the texture (therefore, associating each polygon with a texture region denoted by the texture coordinates of each vertex of the polygon). A texture coordinate for a vertex can be derived by the content display module 115, stored within the 3D environment 470, or determined based on any suitable method.

Figure 4B:
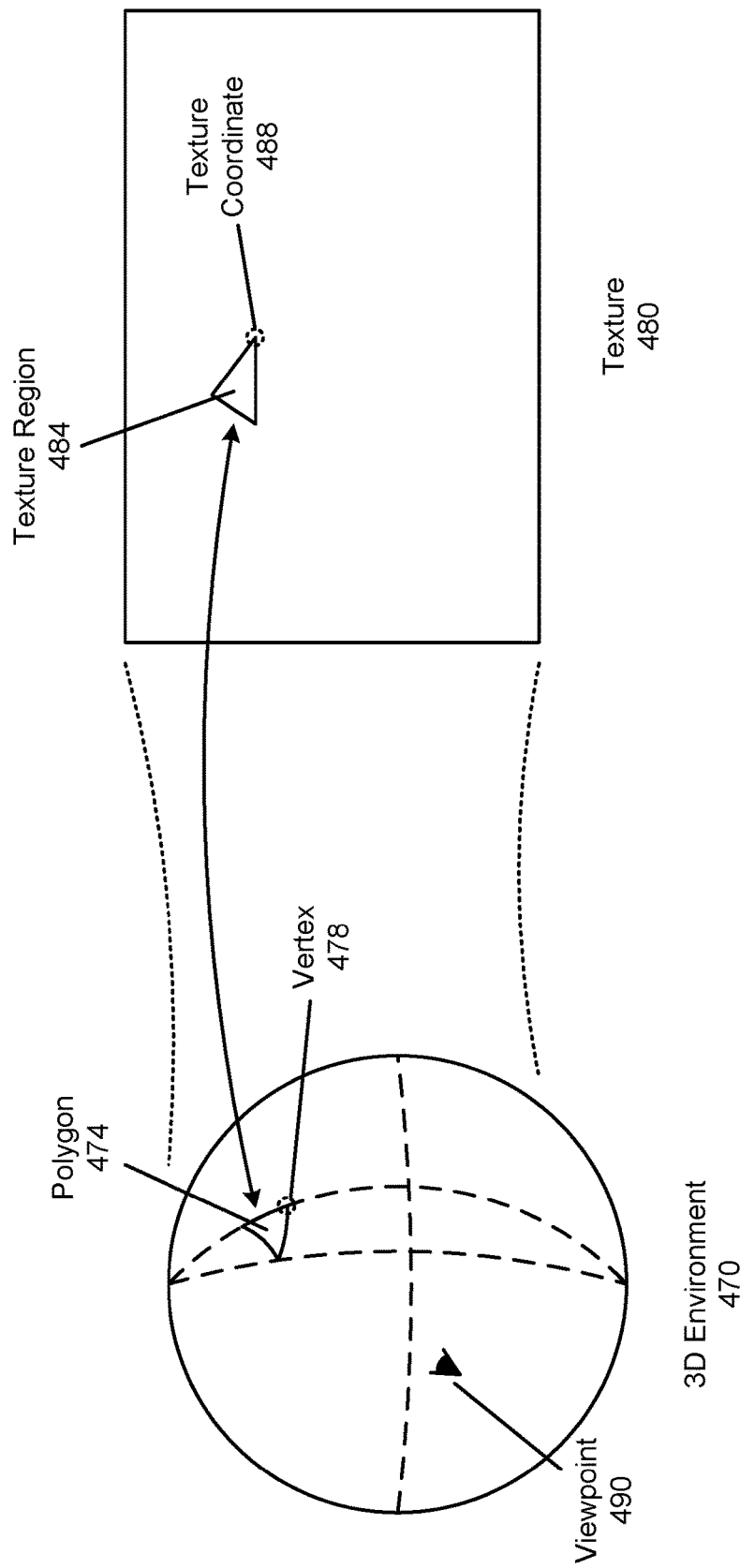
FIG. 4B illustrates a 3D environment and texture to be rendered by a 3D rendering pipeline, according to one embodiment.

FIG. 4B illustrates a 3D environment and texture to be rendered by a 3D rendering pipeline, according to one embodiment. FIG. 4B includes a 3D environment 470 and texture 480 to be rendered from a viewpoint 490. The 3D environment comprises a plurality of polygons 474 each defined by a set of vertices, such as the vertex 478. During the input 410 of the 3D rendering pipeline 400, each polygon of the 3D environment can be mapped to a corresponding texture region in the texture 480, as described above. For example, the polygon 474 is mapped to the texture region 484. Mapping a polygon to a texture region can be accomplished by assigning each vertex (such as the vertex 478) a corresponding texture coordinate within the texture 480 (such as the texture coordinate 488). After the 3D environment is prepared for rendering by the input 410, vertices of the 3D environment can be send to the vertex shader step 420 for further processing.

The vertex shader step 420 applies a vertex shader 425 to one or more vertices of the 3D environment. A vertex shader 425 is a function which operates on a target vertex by altering the properties of the target vertex (such as to shift the vertex to a new location), according to some embodiments. Vertex shaders 425 can be programmable to accomplish different effects based on the functions by which the vertex shader 425 edits the properties of the target vertex. For example, the vertex shader 425 operating on an original vertex (comprising an original position, associated texture coordinates, and one or more associated tris) may return an altered vertex including a new position and different texture coordinates. In some implementations, each instance of a vertex shader 425 operates on a single vertex of the 3D environment. Similarly, some 3D rendering pipelines 400 can apply vertex shaders 425 to many vertices of the 3D environment in parallel. By applying a vertex shader 425 to each vertex in a 3D environment (or a suitable subset of the vertices), the vertex shader step 420 can result in changes to the overall geometry or appearance of the 3D environment. For example, some implementations of a content display module 115 can use a specialized vertex shader 425 to recreate depth information stored in 360 depth content in a 3D environment. The process of using vertex shaders 425 for displaying 360 depth content will be discussed further below.

In some implementations, the set of polygons are culled between the vertex shader step 420 and the rasterizer 430. For example, the content display module 115 can discard vertices and/or polygons not likely to be visible in the output image (for example, polygons fully outside the field of view of the viewpoint), polygons and/or vertices to near or far from the viewpoint, or otherwise filter the set of polygons and/or vertices for any other suitable reason.

After the vertex shader step 420, the rasterizer 430 rasterizes the 3D environment (for example, a 3D environment including one or more texturized polygonal models comprised of vertices) based on the render viewpoint. In some embodiments, the rasterizer 430 outputs a set of fragments, each corresponding to a pixel location in the output image. A fragment can comprise any suitable data for determining the color of a pixel in the output image, such as color or pixel intensity information (either directly or from interpolated texture coordinates), alpha channel information, and pixel coordinate information, and fragment location information useful to determine if the fragment is used to render the associated pixel in the output image, such as a fragment depth measuring the depth of the fragment from the viewpoint. Multiple fragments can correspond to the same pixel, for example in the case of several objects occluding each other, but not every fragment associated with a pixel is necessarily used in the final rendering of the pixel.

During rasterization, the rasterizer 430 can interpolate polygons of the 3D environment, generating a set of fragments corresponding to the area of each polygon that would be visible in the output image. In some implementations, the texture, color, or pixel intensity information for the fragments of a polygon are interpolated based on the texture coordinates of the vertices of the polygon. For example, a fragment located exactly in the center of the three vertices of a tri (triangular polygon) can be associated with texture coordinates exactly between the texture coordinates of the three vertices (for example, obtained by averaging the three vertices of the tri). Similarly, a fragment at the same position as a vertex may have the same texture coordinates as that vertex. After the rasterizer 430 generates a set of fragments form the 3D environment, the content display module 115 can use the generated fragments to determine the output image. In some embodiments, each fragment is associated with a fragment depth, for example based on the distance of the fragment from the viewpoint from the viewpoint 490. In some embodiments, the fragment depth is used to select which fragment to display.

The fragment shader step 440 applies a fragment shader 445 to one or more fragments of the 3D environment. In some embodiments, a fragment shader 445 is a function which alters the properties of a target fragment, for example by changing the color or pixel intensity information associated with that fragment. In some implementations of a 3D rendering pipeline 400, the fragment shader 445 is programmable to accomplish different functionality by modifying the properties of the target fragment based on different criteria. By applying a fragment shader 445 to each fragment of a 3D environment, the fragment shader step 440 can result in changes to the overall output of the 3D rendering pipeline. In some implementations, each instance of a fragment shader 445 operates on a single fragment of the 3D environment. Similarly, some 3D rendering pipelines 400 can apply fragment shaders 445 to many fragments of the 3D environment in parallel. In some implementations, a specialized fragment shader 445 is used by the content display module 115 to recreate depth in a 3D environment generated from 360 depth content. The process of using fragment shaders 445 for displaying 360 depth content will be discussed further below.

The output 450, in some embodiments, can process each fragment to determine the output image. As noted above, each pixel of the output image can be associated with multiple fragments, each at a different depth. For example, in the case of the occluded objects a given pixel can be associated with at least one fragment from each object. In some cases, the fragment with a smaller depth (representing the color of the front object) is used to render the color of the pixel and the other fragments can be discarded (depending on the transparency of the front object and other suitable factors). After each pixel of the output image is determined any suitable image processing steps can be performed on the output image (for example, color grading, sharpening, etc.) and the content display module 115 can send the output image to a display device of the user device 110 for display to a user.

Vertex Shader Implementation

As described above, the content display module 115 can use a 3D rendering pipeline 400 to render 360 depth content.

In some implementations, the 360 depth frame (or a frame extracted from the 360 depth content) is used as a texture for a 3D sphere used as the 3D environment for the 3D rendering pipeline 400. In some implementations, the size of the 3D sphere is standardized for all (or most) 360 depth content rendered by the content display module 115. Therefore, as described above, the unmodified 3D sphere (even when textured by image data 320 of the 360 depth content) does not represent the depth information 330 of the 360 depth content.

Therefore, in some embodiments, the content display module 115 uses a vertex shader 425 designed to interpret depth information 330 of the 360 depth content and modify the 3D sphere to reflect the depth information 330. For example, the vertex shader 425 can be programmed to shift each vertex of the 3D environment (such as a textured sphere) proportional to an associated depth recorded in the depth information 330. Because the content display module 115 manipulates the vertices of the 3D environment to represent the depth information, the amount of depth information that can be incorporated into the output image depends on the number and spacing of the vertices (and therefore polygons) of the 3D environment. In some implementations, the textured sphere 520 is generated such that each pixel of the depth map 550 is associated with at least one polygon of the textured sphere (for example, two tris may be required to represent a square pixel). For example 360 depth content with a "4k" resolution (3840×2160) for each of the image data 320 and depth map 330 may require a 3D sphere of about 8000 tris to represent the depth information. In other embodiments, a lower polygon count 3D sphere can be used, resulting in a more efficient 3D rendering pipeline 400 at the cost of less granular depth representation in the output image. Even when attempting to reduce the number of polygons in the 3D environment, using the vertex shader 425 to represent depth information can use a 3D sphere with a much higher polygon count than traditionally used to render a sphere.

Figure 5:
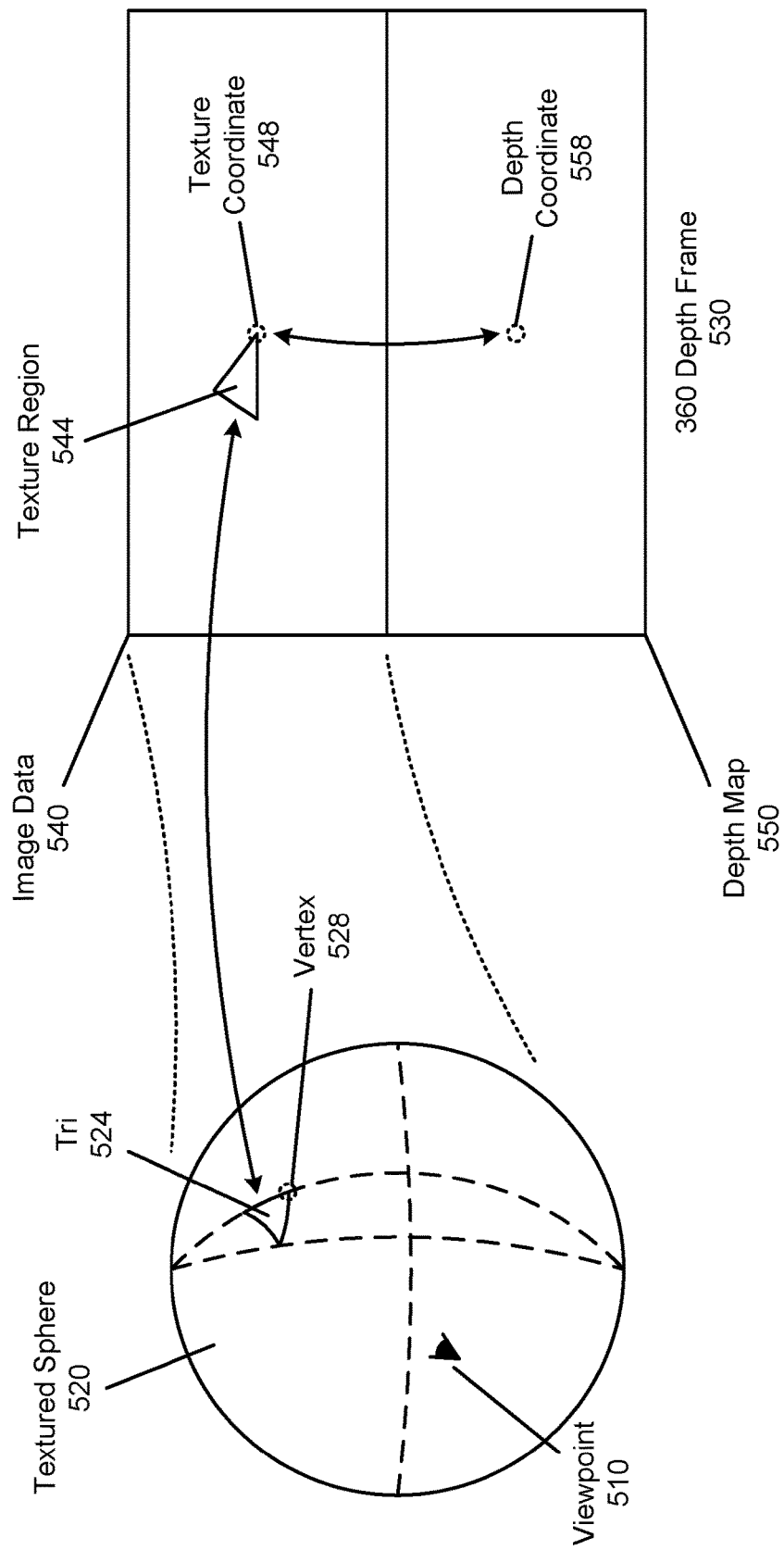
FIG. 5 illustrates an example mapping between a texturized sphere and a corresponding area in a 360 depth content, according to one embodiment.

FIG. 5 illustrates an example mapping between a texturized sphere and a corresponding 360 depth frame, according to one embodiment. FIG. 5 shows a textured sphere 520 to be rendered by the 3D rendering pipeline 400 from a viewpoint 510. The textured sphere 520 is associated with a 360 depth frame 530 used as texture information by the 3D rendering pipeline 400. The textured sphere 520 can be comprised of a plurality of tris (triangular polygons), including the tri 524. In some embodiments, each tri of the textured sphere 520 is associated with a texture region of the 360 depth frame 530 based on the positioning of the tri on the textured sphere 520, for example the tri 524 can be associated with the texture region 544. According to some implementations, each vertex (such as the vertex 528) of a tri is associated with a specific texture coordinate 548 within the 360 depth frame 530 (and therefore partially defining the texture region associated with the tri).

Each 360 depth frame 530 from 360 depth content contains both image data 540 encoding the appearance of a scene and a depth map 550 containing depth information for the scene, according to some embodiments. In some implementations, the textured sphere 520 is mapped to the image data 540 of the 360 depth frame 530 (that is, each vertex 528 of the textured sphere can be mapped to a texture coordinate 548 in the image data 540 section of the 360 depth frame 530). However, the content display module 115 can assign the entire 360 depth frame 530 (containing both the image data 540 and the depth map 550) as texture information for rendering the textured sphere 520, allowing the 3D rendering pipeline 400 to both access the image data 540 (to use as texture information for the textured sphere 520) and the depth map 550 via accessing the corresponding areas of the 360 depth frame 530. As described above, the 360 depth video format 310 can be defined such that each image coordinate 325 has a corresponding depth coordinate 335 accessible via a defined depth transform 340. For example, 360 depth frame 530, the texture coordinate 548 corresponds to the depth coordinate 558.

Using the depth transform 340, the content display module 115 can, for example via a vertex shader 425 or fragment shader 445, access depth information for any given texture coordinate 548. In some implementations, a vertex shader 425 determines the correct depth for a vertex 528 by applying the depth transform 340 to the texture coordinate 548 (determining the depth coordinate 558). Then, using a texture lookup function, the vertex shader 425 retrieves the depth information for the vertex 528 stored in the depth map 550 at the depth coordinate 558. Based on the received depth information, the vertex shader 425 can then shifts the position of the vertex 528. In some embodiments, the depth map 550 encodes the depth relative to the origin point of the textured sphere 520 and the 3D environment (either directly or in a suitable format such as log(d) or 1/d). The vertex shader 425 can then calculate the difference between the retrieved depth and the current position of the vertex 428 to recreate the correct depth for the vertex 428. Depending on the retrieved depth and the current position of the vertex 428, the vertex 428 can be shifted inwards or outwards from the origin point of the textured sphere 520. The vertex shader step 420 can apply the vertex shader 425 to each vertex of the textured sphere 520, therefore shifting each vertex to the correct position based on the depth map 550.

Figure 6:
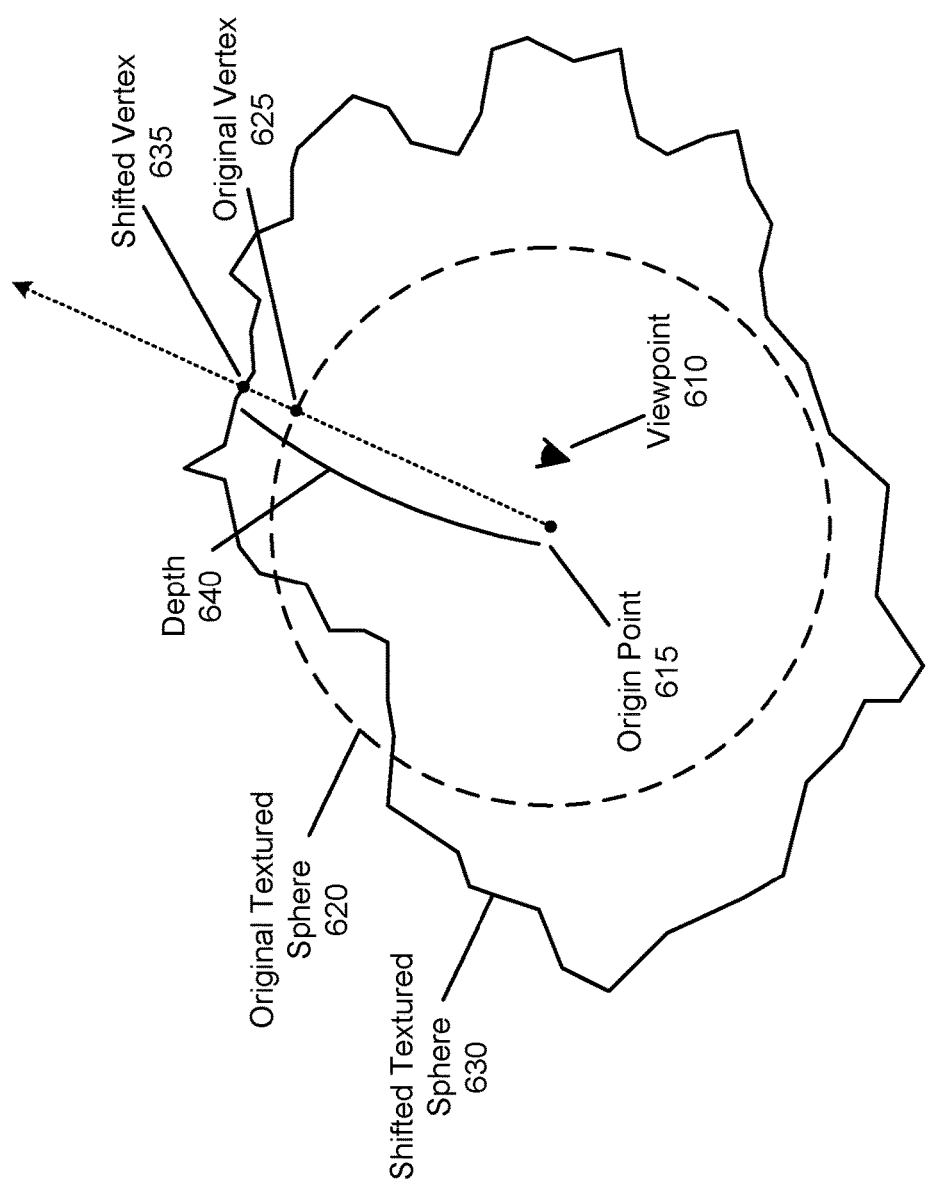
FIG. 6 illustrates an example shifted texturized sphere generated based on 360 depth context using the vertex shader method, according to one embodiment.

FIG. 6 illustrates an example shifted texturized sphere generated based on 360 depth context using the vertex shader method, according to one embodiment. The environment 600 of FIG. 6 comprises a top-down view of a textured sphere centered on an origin point 615 being rendered from a viewpoint 610 by a content display module 115. The original textured sphere 620 (comprising the original vertex 625) can represent the textured sphere during the 3D rendering pipeline 400 but prior to the vertex shader step 420. Similarly, the shifted textured sphere 630 (comprising the shifted vertex 635) can represent the same textured sphere after the vertex shader step 420.

During the vertex shader step 420 of the 3D rendering pipeline 400, a vertex shader 425 can operate over the original vertex 425. As described above, the vertex shader can determine a depth 640 associated with the original vertex 625 (for example, by using depth information from a depth map 550) and change the position of the original vertex 640 to match the determined depth 640, resulting in the shifted vertex 635. In some embodiments, the angle between the original vertex 625 and the origin point 615 is maintained as the original vertex 625 is shifted to the shifted vertex 635 (that is, the origin point 615, original vertex 625, and shifted vertex 635 may be collinear). Applying the vertex shader 425 to each vertex of the original textured sphere 620 results in the shifted textured sphere 630, which represents both the image data 540 (as the texture of the shifted textured sphere 630) and the depth map 550 (via the shifted positions of the vertices) of the 360 depth frame 530. After generating the shifted textured sphere 630, the 3D rendering pipeline 400 can continue rendering the 3D environment from the viewpoint 610. For example, by rasterizing the 3D environment as normal.

Figure 7:
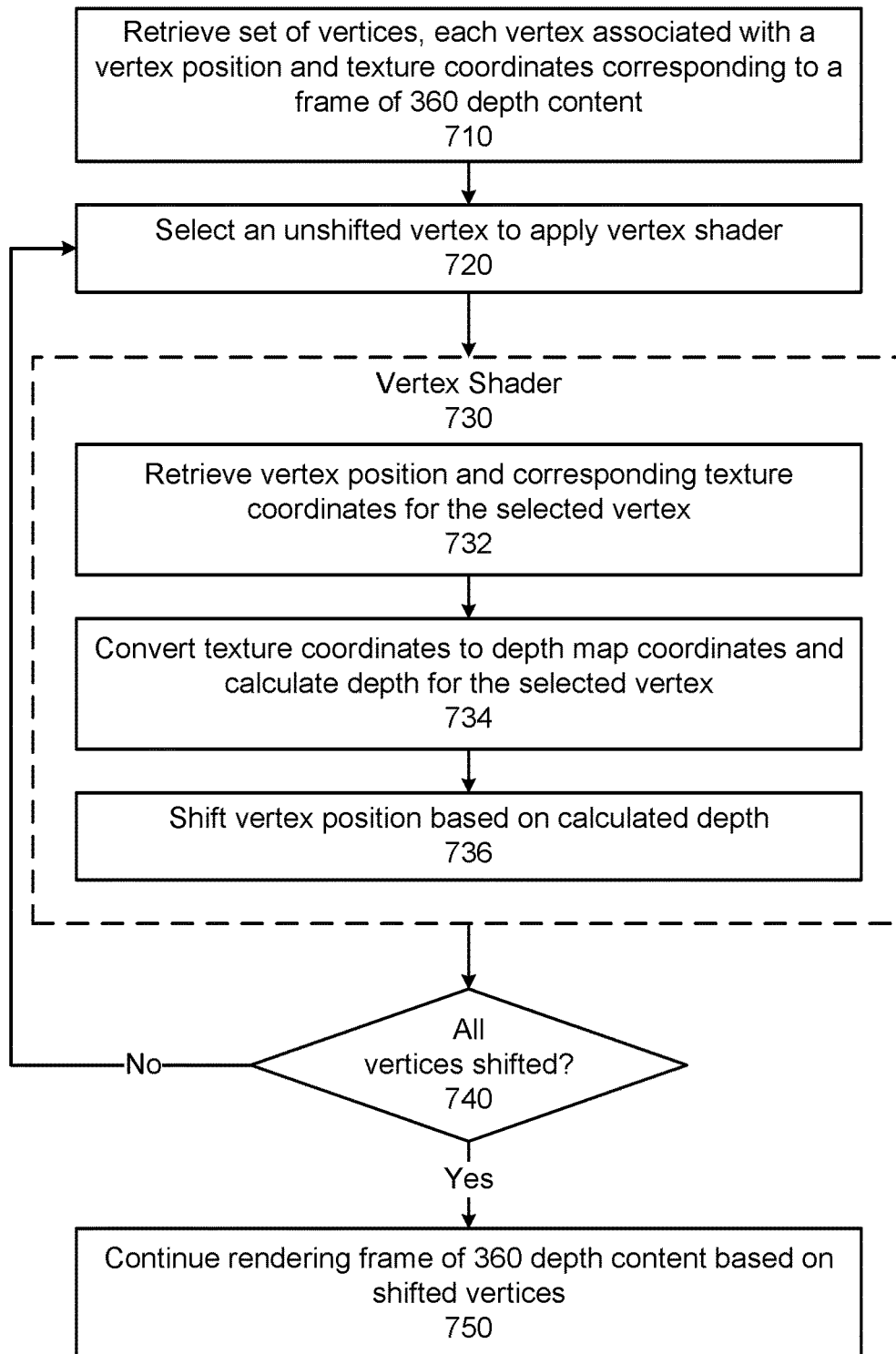
FIG. 7 is a flowchart illustrating an example process for rendering 360 depth content using a vertex shader to simulate depth, according to one embodiment.

FIG. 7 is a flowchart illustrating an example process for rendering 360 depth content using a vertex shader to simulate depth, according to one embodiment. The process 700 of FIG. 7 can be executed, for example, by the content display module 115 during the execution of a 3D rendering pipeline 400. The process 700 begins when the content display module receives 710 and/or selects a set of vertices to render, where each vertex comprises a vertex position within the 3D environment and texture coordinates corresponding to a frame of 360 depth content. Then a vertex of the set of vertices is selected 720 to be modified by a vertex shader. The vertex shader 730 (including several substeps) can then operate on the selected vertex. In one embodiment, the vertex shader 730 begins by retrieving 732 the vertex position and texture coordinates of the selected vertex. Based, for example, on a suitable depth transform, the vertex shader converts the retrieve texture coordinates into depth coordinates which are then used to calculate 734 a depth for the selected vertex. Using the retrieved information, the vertex shader can shift 736 the vertex position associated with the selected vertex based on the calculated depth. In some implementations, the vertex shader 730 process is applied to each vertex of the 3D environment (or a suitable subset of vertices), until all vertices have been shifted 740. The content display module then proceeds with rendering 750 the frame of 360 depth content using the shifted vertices.

As described above, rendering 360 depth content into an output image can be more computationally intensive than rendering traditional stereo 360 content. When using the vertex shader implementation (using the vertex shader 425 to represent the depth information 330 for each vertex), the 3D environment (such as the textured sphere 520) has a high polygon count, and therefore additional processing power to render. Therefore, some implementations of a content display module 115 can employ techniques to reduce the amount of polygons to be rendered without reducing the quality of the rendered output image.

Figure 8:
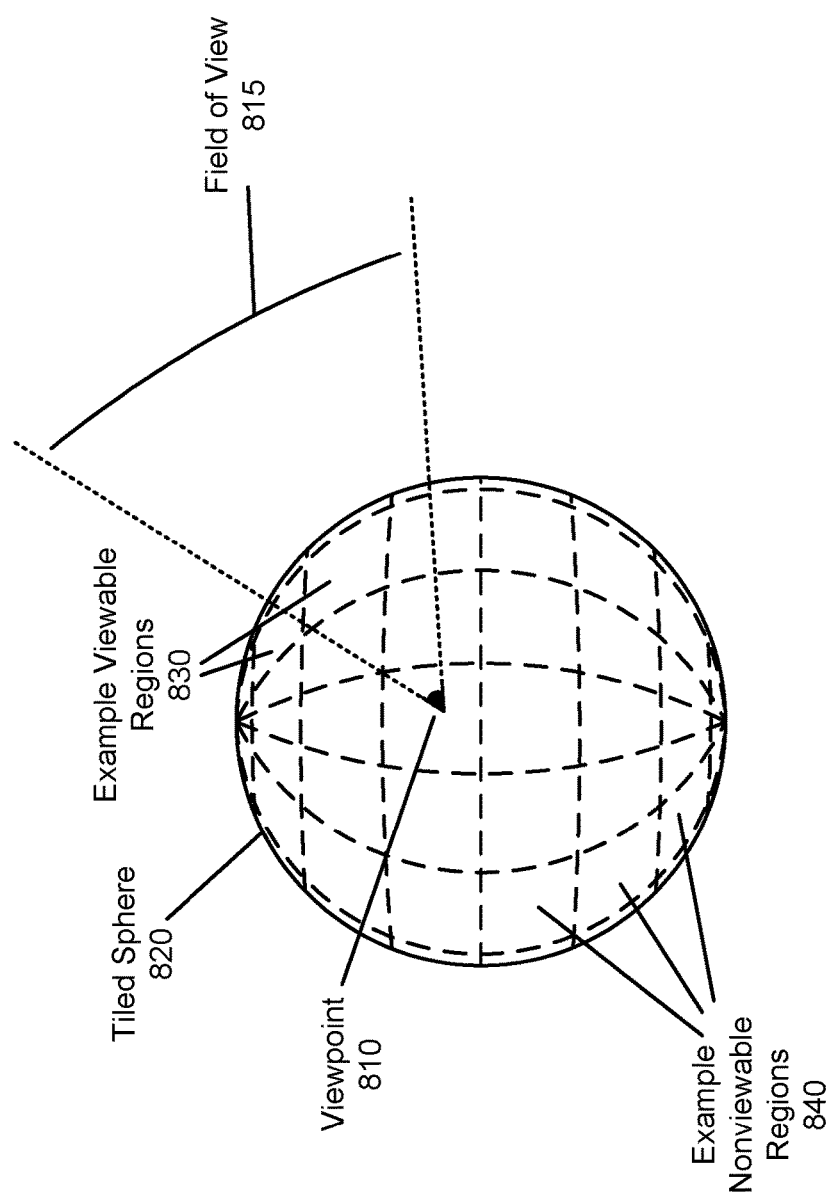
FIG. 8 illustrates an example tiled textured sphere for rendering 360 depth content, according to one embodiment.

For example, some implementations use a tiling method to eliminate regions of the textured sphere that will not be visible in the output image, reducing the overall computational resources needed to display 360 depth content. FIG. 8 illustrates an example tiled textured sphere for rendering 360 depth content, according to one embodiment. The environment 800 comprises a tiled sphere 820 to be rendered into an output image from a viewpoint 810. The output image can have a defined field of view 815 (for example, based on the field of view of the display hardware of the user device 110) represented by the field of view cone 815 centered on the viewpoint 810. The tiled sphere 820 can be a textured sphere 520 segmented into a set of tiles, each representing a region of the tiled sphere 820. In some implementations, the content display module 115 can render each tile separately (and later assemble the partial output images from the rendered tiles into the final output image). Separately rendering each time of the tiled sphere 820 can lead to additional processing overhead, for example, by resulting in additional draw calls and/or passes through the 3D rendering pipeline 400. However, using a tiled sphere 820 allows the content display module 115 to cull non-visible tiles prior to rendering, resulting in a net efficiency improvement for the content display module 115.

For example, prior to rendering each tile of the tiled sphere, the content display module 115 can check if any portion of the tile against the field of view 815. If any part of the tile is within the field of view 815 (such as for the example viewable regions 830), the content display module 115 can proceed with rendering that tile. If the tile lies fully outside the field of view (such as the example nonviewable regions 840), the content display module 115 can move to the next tile without rendering the nonviewable region 840.

Fragment Shader Implementation

As described above, the content display module 115 can use a 3D rendering pipeline 400 to render 360 depth content. In some implementations, the 360 depth content (or a frame extracted from the 360 depth content) is used as a texture for a 3D sphere used as the 3D environment for the 3D rendering pipeline 400. In some implementations, the size of the 3D sphere is standardized for all (or most) 360 depth content rendered by the content display module 115. Therefore, as described above, the unmodified 3D sphere (even when textured by image data 320 of the 360 depth content) does not represent the depth information 330 of the 360 depth content.

In some embodiments, the content display module 115 uses a fragment shader 445 designed to interpret depth information 330 of the 360 depth content and to modify the output color of each fragment based on the depth information 330. The fragment shader method as described herein can be an alternative to the vertex shader methods described above. For example, the fragment shader 445 can be programmed to alter the color of each fragment based on an associated depth for the fragment recorded in the depth information 330. In some implementations, the content display module 115 can uses ray tracing techniques in the fragment shader to determine the pixel intensity information for each fragment.

Figure 9:
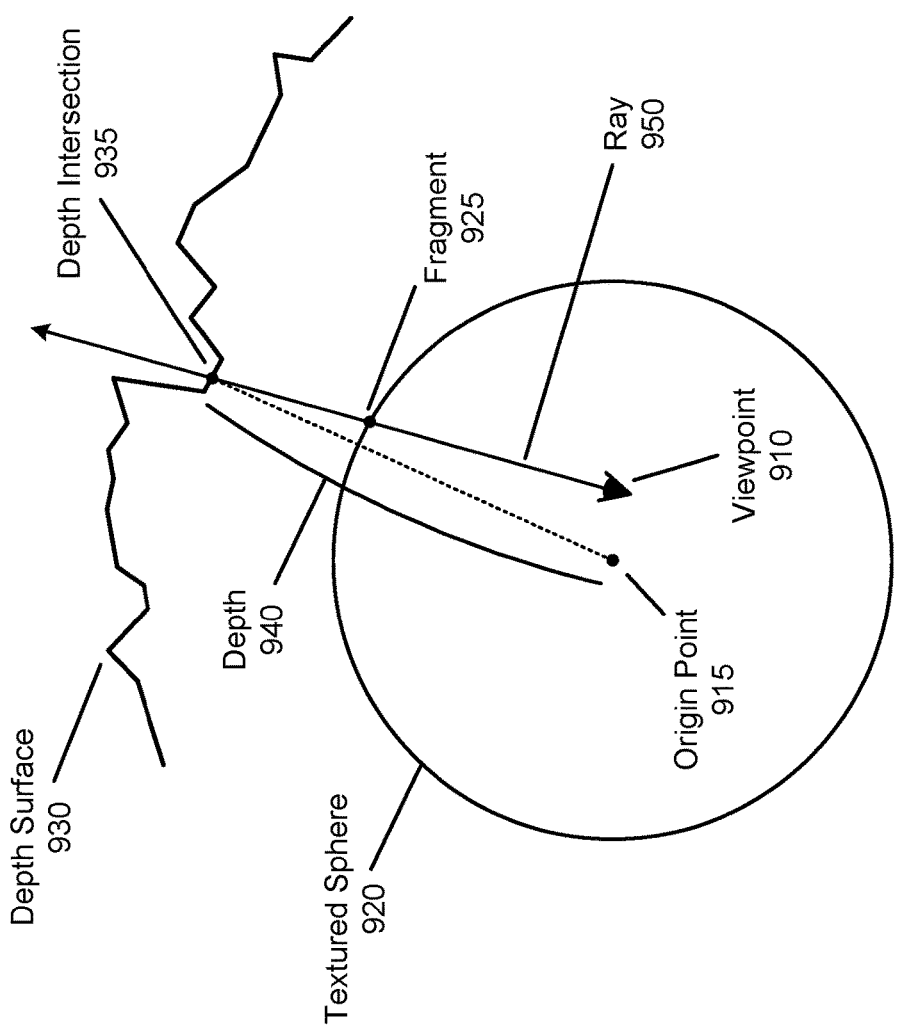
FIG. 9 illustrates an example depth generated for a fragment of a texturized sphere, according to one embodiment.

FIG. 9 illustrates an example depth for a fragment of a texturized sphere, according to one embodiment. The environment 900 of FIG. 9 comprises a top-down view of a textured sphere 920 centered on an origin point 915 being rendered from a viewpoint 910 (for example, by the content display module 115). The original textured sphere 920 can represent the textured sphere during the 3D rendering pipeline 400 but prior to rasterization 430. The rasterization step 430, as described above, can rasterize the textured sphere 920 into a set of fragments (such as the fragment 925).

The textured sphere 920 or other 3D environment can be set up specifically for use in a fragment shader based ray tracing method as described herein. In some implementations, the fragment shader 445 determines final pixel intensity information directly based on the fragment position and other suitable variables, without referencing the original pixel intensity information of the fragment. For example, a fragment shader 445 using ray tracing techniques to determine pixel intensity can user a 3D environment specifically set up to facility the ray tracing technique. For example, the viewpoint 910 of the 3D environment can be stored as a variable (for example, as a "uniform") and passed the fragment shader 445 as a separate value. Additionally, the viewpoint parameter of the 3D rendering pipeline can be set to the origin point 915 to save computation cycles in the 3D rendering pipeline 400 prior to the fragment shader step 445 (where the actual viewpoint 910 can be passed to the fragment shader as a variable). In some implementations, the vertex shader 425 can be used to pre-calculate suitable values used by the fragment shader 445 without shifting the vertices of the 3D environment.

The fragment 925 contains color, hue, and/or brightness information (herein, "pixel intensity information" such as RGB values for displaying a pixel) for a pixel of the output image, and can be generated by the rasterizer 430 based on a polygons of the 3D environment. In some implementations, the fragment 925 contains interpolated texture coordinates indication a location within the 360 depth frame of the pixel intensity information for the fragment 925 (typically these texture coordinates would fall within the image data 540). As described above, a fragment shader 445 can update the pixel intensity information or texture coordinates of the fragment 925 based on depth information stored within the 360 depth frame. To determine the pixel intensity information, the fragment shader 445 can access an associated 360 depth frame using a texture access function, for example, to access the image data 320 for a specific point of the 360 depth frame. Similarly, the fragment shader can access depth information 330 for the 360 depth frame, using the texture access function.

The depth surface 930, in the embodiment of FIG. 9, represents the stored depth information within the 360 depth frame. For example, the 360 depth frame can include a depth map which, if projected into 3D space, would form the depth surface 930.

For each fragment of the 3D environment, a corresponding ray exists from the viewpoint 910 through the fragment which represents the user's view at the specific angle represented by the fragment to the 3D environment (represented by the depth surface 930). For example, the ray 950 for the fragment 925 intersects with the depth surface 930 at the depth intersection 935. The depth intersection 935 can represent the part of the 3D environment associated with the pixel intensity information for the fragment 925. In some implementations, each ray 950 can be represented by an endpoint (here, the viewpoint 910) and a unit vector representing the direction of the ray. For example, the ray 950 (r) can have an endpoint of the viewpoint 910 (v) and a direction r determined by the viewpoint 910 and the fragment position (f) of the fragment 910. In some embodiments, after determining the ray 950 and the depth intersection 935, the fragment shader 445 calculates the image coordinate 325 associated with the depth intersection 935 and modify the fragment to include the associated pixel intensity information in the image data 320 of the 360 depth frame.

As described above, a fragment shader 445 operating on the fragment 925 can use ray tracing techniques to determine both the direction of the ray 950 and the depth intersection 935. In some implementations, the ray direction for the ray 950 can be determined based on the relative positions of the ray viewpoint 910 and fragment 925. However, the depth intersection 935 can require more computation to determine (for example, because the depth surface 930 is encoded in the depth map 550 and not easily mathematically defined). In some implementations, the fragment shader uses a "ray marching" algorithm to iteratively determine the depth intersection 935 (and therefore the length of the ray 950).

Figure 10:
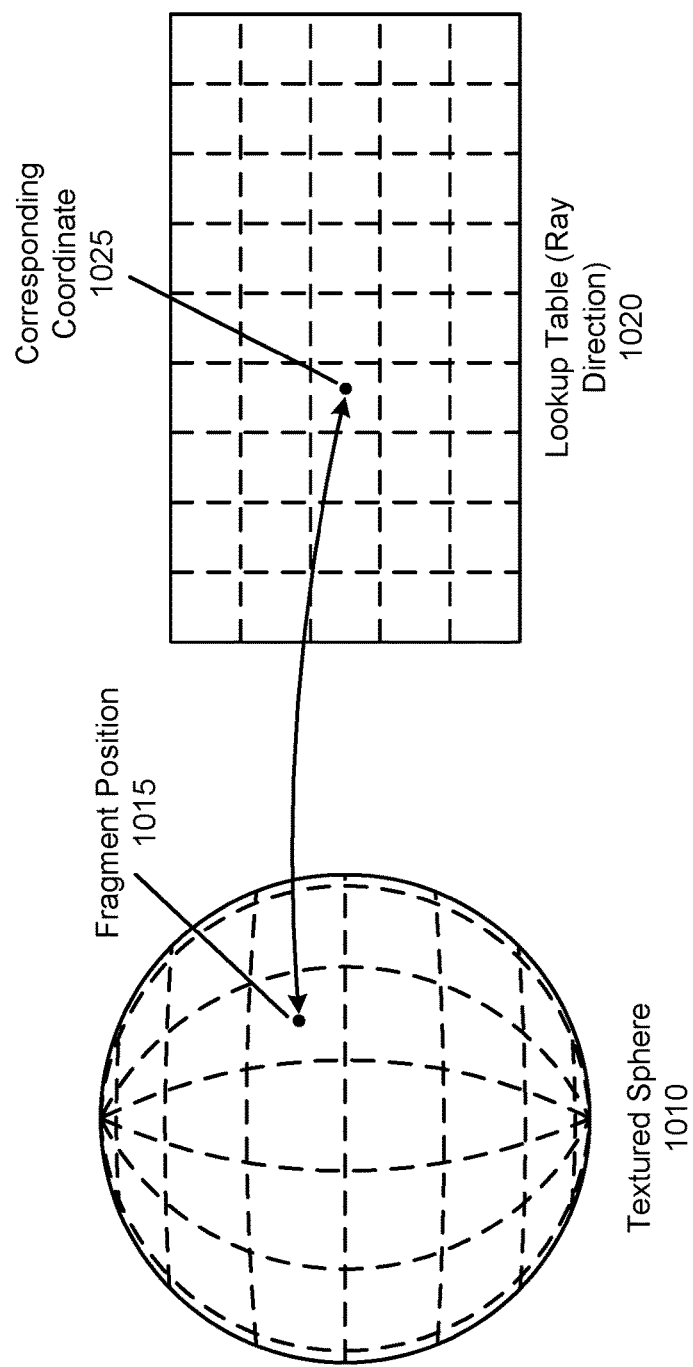
FIG. 10 illustrates an example lookup table for performing ray tracing in a fragment shader, according to one embodiment.

FIG. 10 illustrates an example lookup table for performing ray tracing in a fragment shader, according to one embodiment. In some embodiments, ray marching algorithms frequently need to determine the ray direction for a ray 950 based on the 2D texture coordinates associated with the ray. For example, the fragment shader 445 can perform the necessary calculations to determine the ray direction using computational resources. Alternatively, the fragment shader 445 can use a lookup table, such as the lookup table 1020, resulting in greater efficiency when executing the fragment shader 445. The lookup table 1020 can comprise an image or table accessible to the fragment shader 445 containing the ray direction (for example, a unit vector $\hat{r}_d$) associated with each texture coordinate of the image data 540 of the 360 depth frame 530. The lookup table 1020 can be stored in any method accessible to the fragment shader 445, for example as a texture loaded with (or as part of) the 360 depth frame 530.

The ray direction for a given texture position 1015 of a textured sphere 1010 can be stored in the lookup table 1020 at the corresponding coordinate 1025 (located at the texture coordinate associated with the fragment position 1015). In the context of a texture for the textured sphere 520 (for example, the image data 540) the 2D coordinates of the texture can represent scaled versions of the polar angle (θ) and azimuthal angle (φ) of the associated 3D position on the textured sphere. For example (the exact relation can vary based on the size and orientation of the texture) $\theta=2\pi(x_{tex})$ and $\varphi=\pi(y_{tex})$. Similarly, the polar (θ) and azimuthal (φ) angles can be converted to a unit vector $\hat{r}_d$ by $$\hat{r}_d = \begin{bmatrix} \sin\theta\cos\varphi \\ \sin\theta\sin\varphi \\ \cos\theta \end{bmatrix}.$$

However, these values of $\hat{r}_d$ can be pre-calculated and stored in the lookup table 1020.

Figure 11:
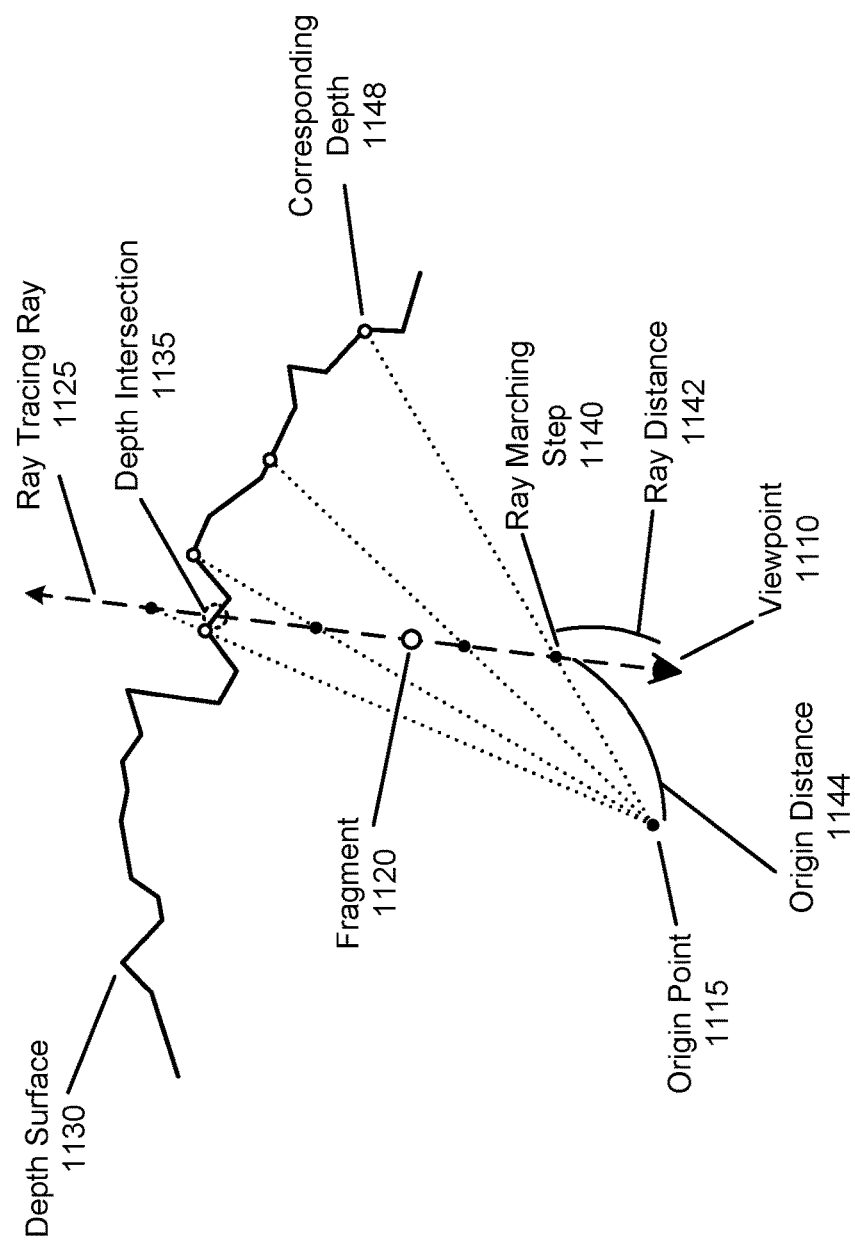
FIG. 11 illustrates an example environment where the depth of a fragment in 360 depth content is estimated using ray marching techniques, according to one embodiment.

As described above, ray marching is an iterative process to determine an intersection between a ray and a 3D environment or surface (for example, the depth intersection 935 between the ray 950 and the depth surface 930). FIG. 11 illustrates an example environment where the depth intersection of a fragment in 360 depth content is estimated using ray marching techniques, according to one embodiment. The environment 1100 of includes the viewpoint 1110 and origin point 1115 of a 3D environment, and a fragment 1120 of the 3D environment to be rendered. A fragment shader 445 operating on the fragment 1120 can use a ray marching algorithm to determine the depth intersection 1135 (and therefore the correct pixel intensity data) for the fragment 1120.

To implement ray marching, the fragment shader 445 can iterate out from the viewpoint 1110 along the ray tracing ray 1125 in series of ray marching steps, such as the ray marching step 1140. Each ray marching step 1140 can represent a position (p) along the ray 1125 that the fragment shader 445 checks to find the depth intersection 1135. Each ray marching step 1140 can also be associated with a ray distance 1142 (t) representing the distance of the ray marching step 1140 from the viewpoint 1110. Ray marching steps can be regularly spaced (i.e. spaced at a fixed interval), randomly generated, or spaced based on any suitable formula. In some implementations, depth accuracy near the viewpoint is more noticeable to a user, so the step size for each ray marching step is selected such that the ray marching steps are closely spaced near the viewpoint 1110 and progressively become further apart as the ray marching algorithm moves further from the viewpoint 1110. For example, a formula of the form t=1/s can determine the ray distance 1142 for each ray marching step (where t is the distance along the ray and s decrements from a fixed starting value, for example, s=1, 0.9, 0.8, 0.7 . . . ). The position for a ray marching step 1140 can be found by moving along the ray 1125 by the ray distance 1142 (represented by p=v+t $\hat{r}_d$).

At each ray marching step the fragment shader 445 can perform one or more checks to determine if the current step of the ray tracing ray 1125 has crossed the depth surface 1130. In some embodiments, the depth information of the 360 depth content is stored relative to the origin point 1115 (for example, a depth map 550 storing depth values representing the distance from the origin point 1115 to the depth surface 1130 at various points). Therefore, to determine whether a ray marching step 1140 has crossed the depth surface 1130, the distance from the ray marching step 1140 to the origin point 1115 (here, the origin distance 1144) can be compared with the corresponding depth 1148 associated with the ray marching step 1140. The corresponding depth 1148 for the ray marching step 1140 can be determined based on the direction of the ray marching step position (p) relative to the origin point 1115. Based on this direction, appropriate texture coordinates can be found and used to access the depth map 550 to return the corresponding depth 1148.

Then, the fragment shader 445 can check if the origin distance 1144 is smaller than the corresponding depth 1148. If the origin distance 1144 is smaller, than the ray marching algorithm hasn't found the intersection between the ray tracing ray 1120 and the depth surface 1130 and another iteration can be performed. However, if the corresponding depth 1148 is smaller than the origin distance 114 the intersection has been found (or passed) and the latest ray marching step 1140 can represent the intersection between the ray tracing ray 1125 and the depth surface 1130. In some embodiments, additional computations can be performed to refine the depth intersection 1135 determined by the ray marching process.

The fragment shader 445 can process an example ray marching step 1140 for a ray distance (t) using the following example process. The fragment shader 445 can first determine the position (p) associated with the ray marching step by $=v+t* \hat{r}_d$. The origin distance 1144 can then be determined by finding $\|p\|$. To find the corresponding depth 1148, the associated texture coordinates can be determined by finding the polar ($\theta$) and azimuthal ($\varphi$) angles associated with the position (p), for example by $\theta_p=a \tan 2(y_p/x_p)$ and $\varphi_p=a \cos(z_p/\|p\|)$. And the result converted into texture coordinates $x_{tex}=\theta/2\pi$ and $y_{tex}=\varphi/\pi$. The texture coordinates can then be used to access the depth map 550 to return the corresponding depth 1148. The corresponding depth 1148 is then compared to the origin distance 1144, and if the depth is smaller than the origin distance ($\|p\|$), the fragment shader 445 can use the current texture coordinates ($x_{tex}$ and $y_{tex}$) to determine the pixel intensity values for the fragment 1120.

Figure 12:
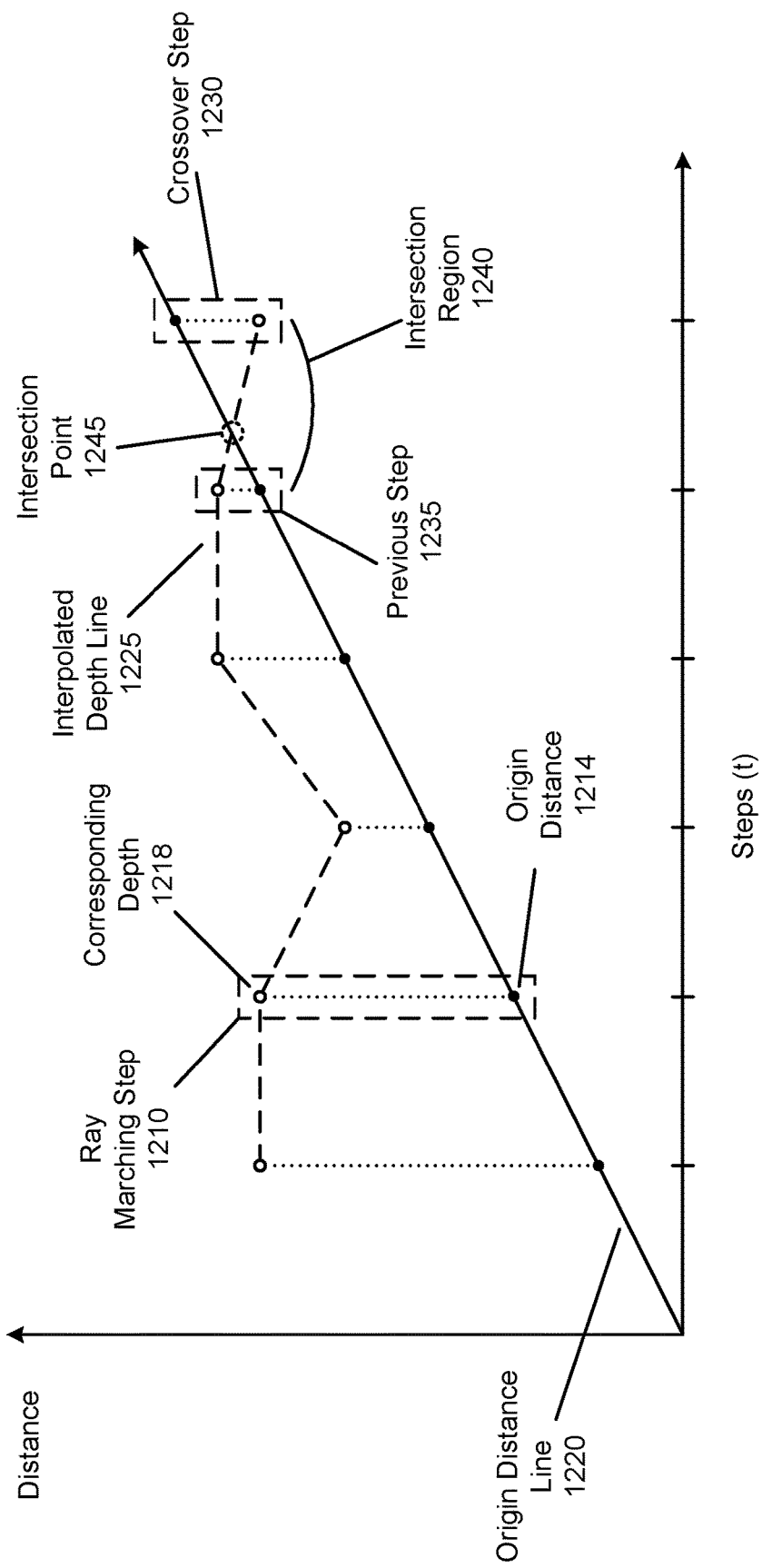
FIG. 12 illustrates an example process for estimating a ray tracing intersection point using depth information from 360 depth content, according to one embodiment.

FIG. 12 illustrates an example process for estimating a ray tracing intersection point using depth information from 360 depth content, according to one embodiment. FIG. 12 charts the relative distance (both origin distance and depth) for a series of ray marching steps on the chart 1200. Each ray marching step (such as the ray marching step 1210, crossover step 1230, and previous step 1235) has an origin distance and a corresponding depth. For example, the ray marching step 1210 is associated with an origin distance 1214 and a corresponding depth 1218. The origin distance of each step can be tracked on the chart 1200 by the origin distance line 1220. In the embodiment of FIG. 12, the origin distance line 1220 is a straight line (that is, each ray marching step 1210 has a constant increment in origin distance from the previous step), but in other embodiments the origin distance line 1220 can be any suitable shape. For example, the shape of the origin distance line 1220 can be influenced by the formula used to determine the step distance, by the relative position of the viewpoint 1110 and the origin point 1115, or based on any other suitable factor. Similarly, the interpolated depth line 1225 can track the corresponding depth associated with each ray marching step. As described above, the goal of the ray marching algorithm can be to determine the intersection between a ray and the depth surface 1130. In some implementations the fragment shader 445 can determine that the depth surface 1130 has been passed if the origin distance 1214 for a ray marching step (for example, at the crossover step 1230) is greater than the corresponding depth 1218 for the ray marching step. In some implementations, determining the crossover step 1230 is the end of the ray marching process, and the pixel intensity information associated with the crossover step 1230 is used to determine the pixel intensity information for the associated fragment 1120.

However, the crossover step 1230 does not always represent the closest available approximation of the depth of the fragment 1120. Finding the crossover step 1230 indicates that an intersection between the depth surface 1230 and the ray tracing ray 1125 has occurred somewhere along the ray 1125 between the crossover step 1230 and the previous step 1235 (representing the ray marching step immediately preceding the crossover step 1230). However, the crossover step isn't necessarily the closest approximation of the depth intersection 935 available to the fragment shader 445. In some embodiments, the crossover step 1230 and previous step 1235 can be further analyzed by the fragment shader 445 to better approximate the depth intersection 1135. For example, the fragment shader 445 can compare the difference between the origin distance and the corresponding depth for both the crossover step 1230 and the previous step 1235 and select the step with the smaller difference (by magnitude) to use to estimate the depth intersection 1135.

In some embodiments, the fragment shader 445 determines the depth intersection estimate by calculating the intersection point of the origin distance line 1220 and the interpolated depth line 1225 between the previous and crossover steps (1235 and 1230). For example, the fragment shader 445 can calculate the equation of the segment of the origin distance line 1220 based on the origin distance associated with each of the previous and crossover steps (1235 and 1230) and use a similar process to determine the segment of the interpolated depth line 1225 based on the corresponding depth of each of the previous and crossover steps (1235 and 1230). The fragment shader 445 can then solve for the intersection point 1245 using any suitable method (for example, iteratively using a linear solver). The intersection point 1245 can then be used to determine the pixel intensity information for the fragment 1120.

In some implementations, the content display module 115 pushes preliminary ray tracing calculations into the vertex shader 425 (to improve efficiency). For example, the vertex shader 425 can be used to determine an approximate depth (relative to the viewpoint 910) for each vertex or polygon of the textured sphere 920. The depth estimates for a polygon can then be used to improve the initialization of the ray marching algorithm in each fragment associated with the polygon. Similarly, some implementations used a mixed approach, combining both the vertex shader and fragment shader methods to represent depth in the 360 depth content. For example, the vertex shader method can be used to represent depth in the relatively smooth areas of the depth map 330. Similarly, the fragment shader method can be used for the more complex areas of the depth map 330.

Figure 13:
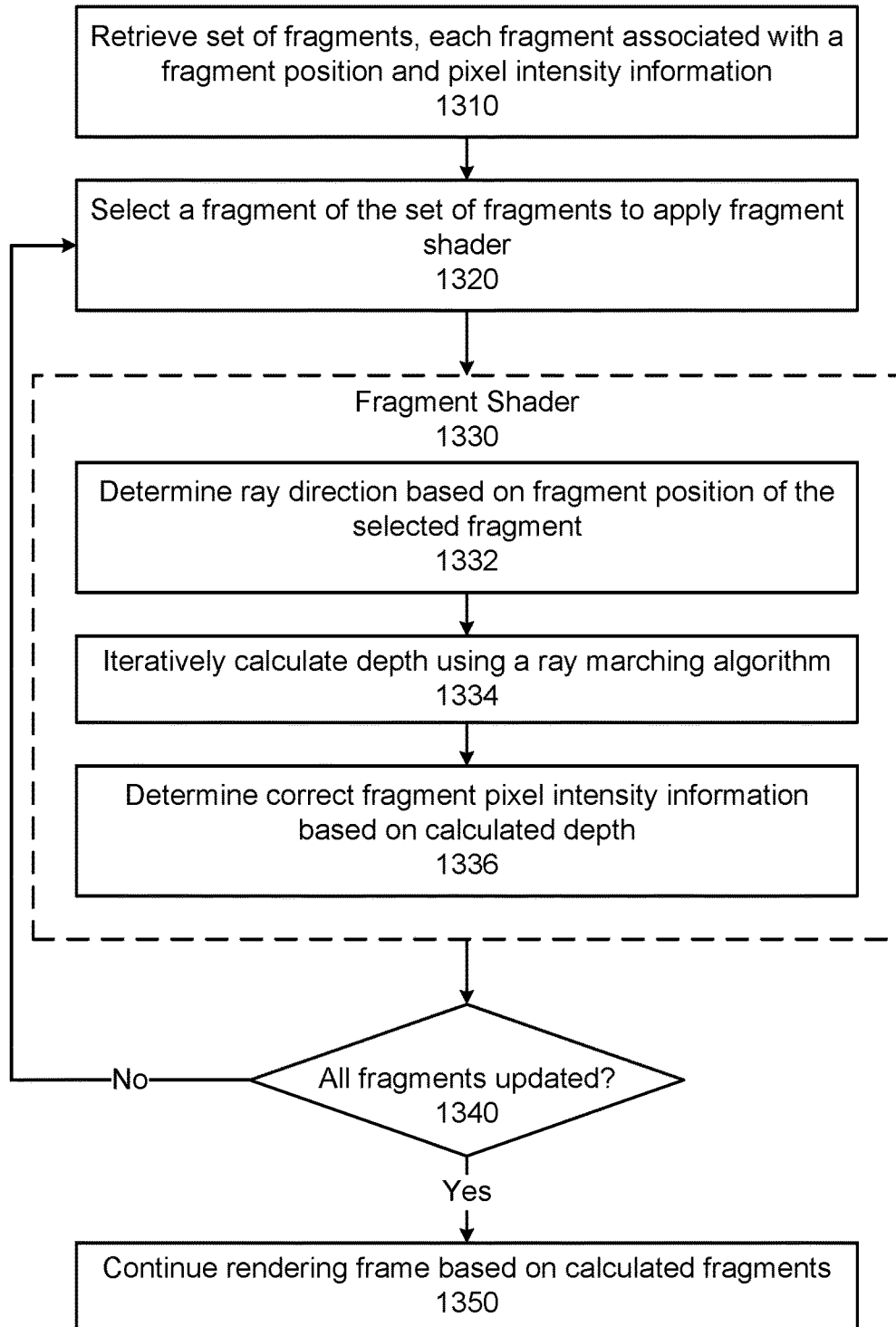
FIG. 13 is a flowchart illustrating an example process for rendering a 3D scene using a fragment shader to represent depth information, according to one embodiment.

FIG. 13 is a flowchart illustrating an example process for rendering a 3D scene using a fragment shader to represent depth information, according to one embodiment. The process 1300 of FIG. 13 begins when the content display module retrieves 1310 a set of fragments, each associated with a fragment position (and pixel intensity information). For example, the set of fragments can be fragments generated by a rasterized of a 3D rendering pipeline. Then, a fragment of the set of fragments is selected 1320 to be modified by a fragment shader. The fragment shader 1330 (including several substeps) can then operate on the selected fragment to determine and/or modify the pixel intensity information of the fragment. In one embodiment, the fragment shader 1330 begins by determining 1332 a ray direction for the selected fragment based on the fragment position of the fragment. Using, for example, ray marching techniques, the fragment shader calculates 1334 a depth for the selected fragment. Using the calculated depth, the fragment shader can determine 1336 pixel intensity information for the selected fragment. In some implementations, the fragment shader 1330 process is applied to each fragment of the 3D environment (or a suitable subset of fragment), until all fragments have been updated 1340. The content display module then proceeds with rendering 1350 the frame of 360 depth content using the updated fragments.

Figure 14:
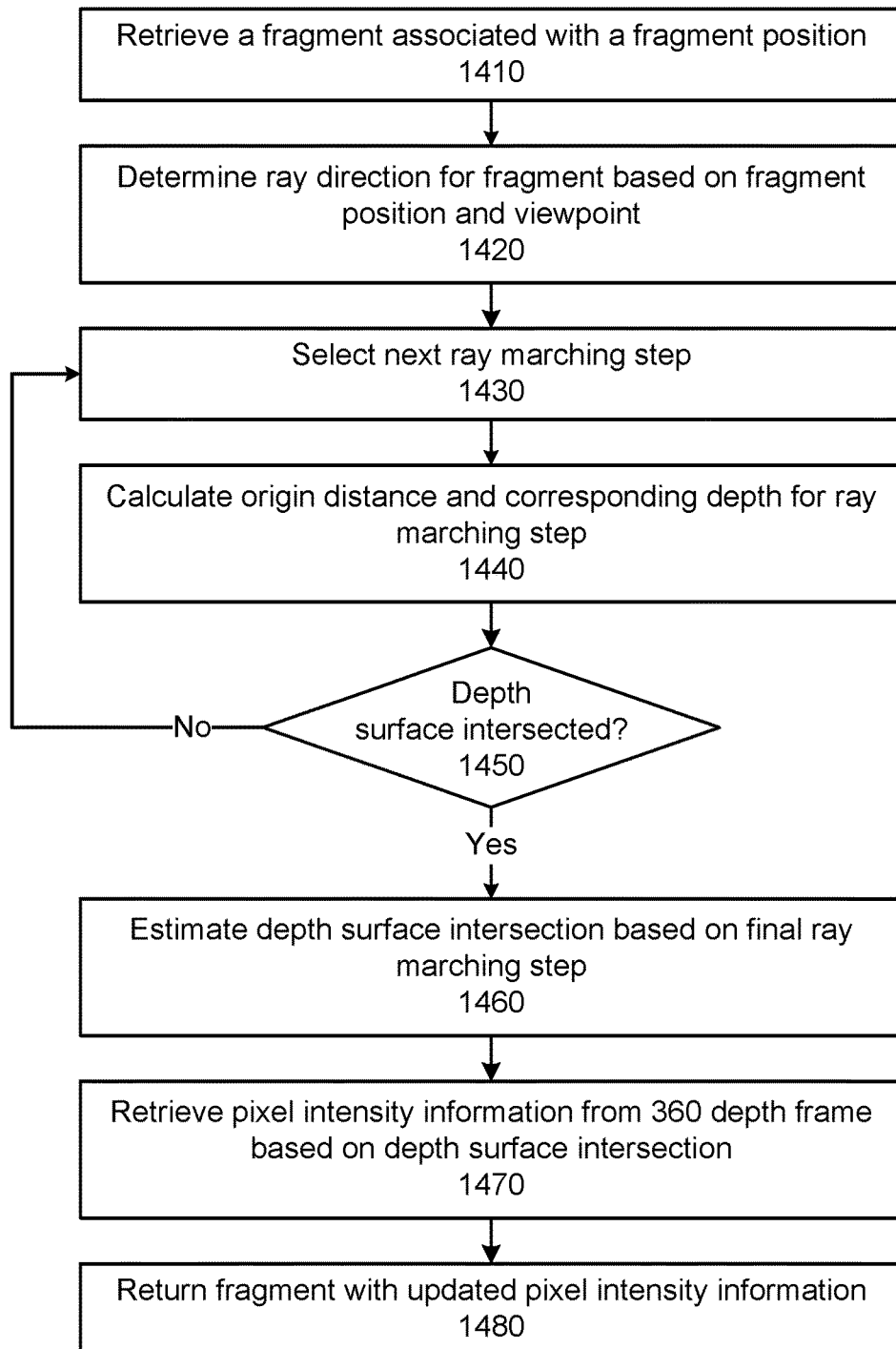
FIG. 14 is a flowchart illustrating an example process for performing ray marching in a fragment shader, according to one embodiment.

FIG. 14 is a flowchart illustrating an example process for performing ray marching in a fragment shader, according to one embodiment. The process 1400 of FIG. 14 begins when a fragment shader retrieves 1410 a fragment and associated fragment position within a 3D environment (such as when rendering an eye view for a 360 depth frame). For example, the fragment shader can be initialized to operate on a specific fragment. Based on the fragment position and the viewpoint for the 3D scene, the fragment shader can determine 1420 a ray direction and ray tracing ray for the fragment. For example, the ray tracing ray can emanate from the viewpoint and intersect with the fragment. Then, the fragment shader can begin the ray marching process by selecting 1430 a ray marching step. For example, by selecting a point along the ray tracing ray based on a predetermined step size or formula. For each ray marching step, the fragment shader can calculate 1440 an origin distance and corresponding depth for the ray marching step. For example, the origin distance can be calculated based on the origin point of the 3D environment and the current ray marching step and the corresponding depth can be determined based on a depth map of an associated 360 depth frame. If the fragment shader determines that the depth surface has been intersected 1450, computation continues, otherwise the fragment shader returns to step 1430 to perform additional ray marching steps. After the depth surface has been intersected, the depth surface intersection can be estimated 1460 based on the final ray marching step. For example, the fragment shader can simply use the last ray marching step as the estimated intersection or can estimate the depth surface intersection using the last ray marching step and the second to last ray marching step (as described above). Based on the estimated depth surface intersection, the fragment shader retrieves 1470 pixel intensity information for the fragment from the 360 depth frame being rendered. Finally, the fragment shader can return 1480 the fragment with the updated pixel intensity information.

When compared, the vertex shader and fragment shader methods can each have advantages and disadvantages. The vertex shader method relies on a high polygon count textured sphere, but the resolution of the output image doesn't affect the processing cost as much (as the vertex shader 425 used to represent the depth information operates on the 3D environment prior to the rasterization step 430). The fragment shader method can use a much lower polygon count 3D environment, however, because the number of fragments generated is (partially) based on the resolution of the output image, rendering high resolution output images can result in high processing cost. Further, using a ray marching algorithm can result in a large amount of texture reads (for example, to determine the corresponding depth 1148 for each ray marching step 1140 from a depth map 930).

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, at a user device, one or more visual content frames each comprising, for each of a set of pixels, image pixel data for the pixel and a depth relative to an origin point of the one or more visual content frames for the pixel, wherein each visual content frame includes a range of viewing angles of a scene;
rendering, at the user device, at least one output image for a viewpoint distinct from the origin point, each output image corresponding to a visual content frame of the one or more visual content frames by:
generating at least a portion of a 3D sphere corresponding to the range of viewing angles of the visual content frame, the 3D sphere comprising a set of vertices, each vertex associated with a vertex position and a set of texture coordinates associated with one or more pixels of the image pixel data;
applying a vertex shader to each vertex of the 3D sphere, the vertex shader configured to shift the vertex position of the vertex based on the texture coordinates associated with the vertex and the depth of the visual content frame for one or more pixels associated with the texture coordinates of the vertex;
rasterizing the 3D sphere including the shifted vertices; and
generating an output image based on the rasterized 3D sphere; and
sending the at least one output image for display to a user of the user device.

2. The method of claim 1, wherein the image pixel data of the one or more visual content frames comprises 360 panoramic images with a 360 degree viewing angle.

3. The method of claim 2, wherein each visual content frame further a depth map containing the depth for each pixel of the set of pixels of the image pixel data.

4. The method of claim 3, wherein each pixel of a depth map encodes a depth for one or more pixels of the image pixel data.

5. The method of claim 1, wherein each visual content frame of the one or more visual content frames comprises a 360 panoramic image and a corresponding depth map stored in a single image file.

6. The method of claim 1, wherein each visual content frame of the one or more visual content frames comprises a 360 panoramic image and a corresponding depth map stored in a single frame of a video file.

7. The method of claim 1, wherein an output image based on the one or more visual content frames is an eye view for display to an eye of a user.

8. The method of claim 7, wherein rendering, at the user device, at least one output image further comprises:
determining, at the user device, a viewpoint for an output image based on a user eye position; and
wherein the output image is based on the viewpoint.

9. The method of claim 1, wherein applying a vertex shader to each vertex of the 3D sphere comprises:
retrieving, at the vertex shader, the vertex position and texture coordinates of a vertex;
determining, at the vertex shader, a depth associated with the vertex based on the texture coordinates of the vertex and one or more depths for one or more pixels of the visual content frame; and
shifting the vertex position based on the determined depth.

10. The method of claim 9, wherein determining a depth associated with the vertex comprises:
applying a depth transform to the texture coordinates to get depth map coordinates within the visual content frame; and
retrieving, from the visual content frame, the depth stored at the depth map coordinates.

11. A non-transitory computer readable storage medium comprising instructions which, when executed by a processor, cause the processor to perform the steps of:
receiving, at a user device, one or more visual content frames each comprising, for each of a set of pixels, image pixel data for the pixel and a depth relative to an origin point of the one or more visual content frames for the pixel, wherein each visual content frame includes a range of viewing angles of a scene;
rendering, at the user device, at least one output image for a viewpoint distinct from the origin point, each output image corresponding to a visual content frame of the one or more visual content frames by:
generating at least a portion of a 3D sphere corresponding to the range of viewing angles of the visual content frame, the 3D sphere comprising a set of vertices, each vertex associated with a vertex position and a set of texture coordinates associated with one or more pixels of the image pixel data;
applying a vertex shader to each vertex of the 3D sphere, the vertex shader configured to shift the vertex position of the vertex based on the texture coordinates associated with the vertex and the depth of the visual content frame for one or more pixels associated with the texture coordinates of the vertex;
rasterizing the 3D sphere including the shifted vertices; and
generating an output image based on the rasterized 3D sphere; and
sending the at least one output image for display to a user of the user device.

12. The non-transitory computer readable storage medium of claim 11, wherein the image pixel data of the one or more visual content frames comprises 360 panoramic images with a 360 degree viewing angle.

13. The non-transitory computer readable storage medium of claim 12, wherein each visual content frame further a depth map containing the depth for each pixel of the set of pixels of the image pixel data.

14. The non-transitory computer readable storage medium of claim 13, wherein each pixel of a depth map encodes a depth for one or more pixels of the image pixel data.

15. The non-transitory computer readable storage medium of claim 11, wherein each visual content frame of the one or more visual content frames comprises a 360 panoramic image and a corresponding depth map stored in a single image file.

16. The non-transitory computer readable storage medium of claim 11, wherein each visual content frame of the one or more visual content frames comprises a 360 panoramic image and a corresponding depth map stored in a single frame of a video file.

17. The non-transitory computer readable storage medium of claim 11, wherein an output image based on the one or more visual content frames is an eye view for display to an eye of a user.

18. The non-transitory computer readable storage medium of claim 17, wherein rendering, at the user device, at least one output image further comprises:
determining, at the user device, a viewpoint for an output image based on a user eye position; and
wherein the output image is based on the viewpoint.

19. The non-transitory computer readable storage medium of claim 11, wherein applying a vertex shader to each vertex of the 3D sphere comprises:
   retrieving, at the vertex shader, the vertex position and texture coordinates of a vertex;
   determining, at the vertex shader, a depth associated with the vertex based on the texture coordinates of the vertex and one or more depths for one or more pixels of the visual content frame; and
   shifting the vertex position based on the determined depth.

20. The non-transitory computer readable storage medium of claim 19, wherein determining a depth associated with the vertex comprises:
   applying a depth transform to the texture coordinates to get depth map coordinates within the visual content frame; and
   retrieving, from the visual content frame, the depth stored at the depth map coordinates.

* * * * *